US00RE42245E

(19) United States
(12) Reissued Patent
Thomas et al.

(10) Patent Number: US RE42,245 E
(45) Date of Reissued Patent: Mar. 22, 2011

(54) SYSTEM AND METHOD FOR REAL TIME RESERVOIR MANAGEMENT

(75) Inventors: Jacob Thomas, Houston, TX (US); Craig William Godfrey, Dallas, TX (US); William Launey Vidrine, Grapevine, TX (US); Jerry Wayne Wauters, Cypress, TX (US); Douglas Donald Seller, Houston, TX (US)

(73) Assignee: Halliburton Energy Services, Inc., Houston, TX (US)

(21) Appl. No.: 12/436,632

(22) Filed: May 6, 2009

Related U.S. Patent Documents

Reissue of:
(64) Patent No.: 7,079,952
Issued: Jul. 18, 2006
Appl. No.: 10/929,584
Filed: Aug. 30, 2004

U.S. Applications:
(62) Division of application No. 11/704,369, filed on Feb. 8, 2007, which is a continuation of application No. 09/976,573, filed on Oct. 12, 2001, now Pat. No. 6,853,921, which is a continuation-in-part of application No. 09/816,044, filed on Mar. 23, 2001, now Pat. No. 6,356,844, which is a continuation of application No. 09/357,426, filed on Jul. 20, 1999, now Pat. No. 6,266,619.

(51) Int. Cl.
*E21B 43/12* (2006.01)

(52) U.S. Cl. ..... 702/13
(58) Field of Classification Search ..... 702/6, 702/11, 12, 13, 14, 182–185, 188, 9; 700/27, 700/28, 29; 703/10; 367/73; 166/366, 369, 166/52, 53; 73/152.18, 152.29
See application file for complete search history.

(56) References Cited

U.S. PATENT DOCUMENTS 3,045,750 A 7/1962 Peters et al.
3,760,362 A 9/1973 Copland et al.
(Continued)

FOR

EIGN PATENT DOCUMENTS

EP 1 679 424 A2 7/2006
(Continued)

OTHER PUBLICATIONS

Ajayi, et al., "*A Dynamic Optimisation Technique for Simulation of Multi–Zone Intelligent Well Systems in a Reservoir Development*", SPE 84192 Society of Petroleum Engineers, Copyright 2003, pp. 1–7 (7 pages).
Allard et al., "*Reservoir Management Making A Difference In Australia's First Oilfield Developed Entirely With Horizontal Wells*", paper SPE 50051, SPE Asia Specific Oil & Gas Conf., Oct. 12–14 , 1998, pp. 165–173 (9 pages).
(Continued)

*Primary Examiner*—Edward Raymond
(74) *Attorney, Agent, or Firm*—Fish & Richardson P.C.

(57) ABSTRACT

A method of real time field wide reservoir management comprising the steps of processing collected field wide reservoir data in accordance with one or more predetermined algorithms to obtain a resultant desired field wide production/injection forecast, generating a signal to one or more individual well control devices instructing the device to increase or decrease flow through the well control device, transmitting the signal to the individual well control device, opening or closing the well control device in response to the signal to increase or decrease the production for one or more selected wells on a real time basis. The system for field wide reservoir management comprising a CPU for processing collected field wide reservoir data, generating a resultant desired field wide production/injection forecast and calculating a target production rate for one or more wells and one or more down hole production/injection control devices.

55 Claims, 9 Drawing Sheets

U.S. PATENT DOCUMENTS

| | | | |
|---|---|---|---|
| 3,971,926 | A | 7/1976 | Gau et al. |
| 4,461,172 | A | 7/1984 | McKee et al. |
| 4,559,610 | A | 12/1985 | Sparks et al. |
| 4,633,954 | A | 1/1987 | Dixon et al. |
| 4,676,313 | A | 6/1987 | Rinaldi |
| 4,685,522 | A | 8/1987 | Dixon et al. |
| 4,721,158 | A | 1/1988 | Merritt, Jr. et al. |
| 4,738,313 | A | 4/1988 | McKee |
| 5,208,748 | A | 5/1993 | Flores et al. |
| 5,442,730 | A | 8/1995 | Bigus |
| 5,455,780 | A | 10/1995 | Nguyen et al. |
| 5,531,270 | A | 7/1996 | Fletcher et al. |
| 5,547,029 | A | 8/1996 | Rubbo et al. |
| 5,565,862 | A | 10/1996 | Hubbard et al. |
| 5,566,092 | A | 10/1996 | Wang et al. |
| 5,597,042 | A | 1/1997 | Tubel et al. |
| 5,636,693 | A | 6/1997 | Elmer |
| 5,662,165 | A | 9/1997 | Tubel et al. |
| 5,706,892 | A | 1/1998 | Aeschbacher, Jr. et al. |
| 5,706,896 | A | 1/1998 | Tubel et al. |
| 5,710,726 | A | 1/1998 | Rowney et al. |
| 5,721,538 | A | 2/1998 | Tubel et al. |
| 5,730,219 | A | 3/1998 | Tubel et al. |
| 5,732,776 | A | 3/1998 | Tubel et al. |
| 5,764,515 | A | 6/1998 | Guerillot et al. |
| 5,767,680 | A | 6/1998 | Torres-Verdin et al. |
| 5,829,520 | A | 11/1998 | Johnson |
| 5,841,678 | A | 11/1998 | Hasenberg et al. |
| 5,842,149 | A | 11/1998 | Harrell et al. |
| 5,859,437 | A | 1/1999 | Hsu et al. |
| 5,871,047 | A | 2/1999 | Spath et al. |
| 5,873,049 | A | 2/1999 | Bielak et al. |
| 5,881,811 | A | 3/1999 | Lessi et al. |
| 5,959,547 | A | 9/1999 | Tubel et al. |
| 5,975,204 | A | 11/1999 | Tubel et al. |
| 5,979,558 | A | 11/1999 | Bouldin et al. |
| 5,992,519 | A | 11/1999 | Ramakrishnan et al. |
| 6,002,985 | A | 12/1999 | Stephenson |
| 6,021,377 | A | 2/2000 | Dubinsky et al. |
| 6,021,662 | A | 2/2000 | Moulu et al. |
| 6,022,985 | A | 2/2000 | Authelin et al. |
| 6,023,656 | A | 2/2000 | Cacas et al. |
| 6,076,046 | A | 6/2000 | Vasudevan et al. |
| 6,095,262 | A | 8/2000 | Chen |
| 6,098,020 | A | 8/2000 | den Boer |
| 6,101,447 | A | 8/2000 | Poe, Jr. |
| 6,112,126 | A | 8/2000 | Hales et al. |
| 6,112,817 | A | 9/2000 | Voll et al. |
| 6,176,323 | B1 | 1/2001 | Weirich et al. |
| 6,182,756 | B1 | 2/2001 | Garcia et al. |
| 6,192,980 | B1 | 2/2001 | Tubel et al. |
| 6,236,894 | B1 | 5/2001 | Stoisits et al. |
| 6,266,619 | B1 | 7/2001 | Thomas et al. |
| 6,281,489 | B1 | 8/2001 | Tubel et al. |
| 6,282,452 | B1 | 8/2001 | DeGuzman et al. |
| 6,356,844 | B2 | 3/2002 | Thomas et al. |
| 6,397,946 | B1 | 6/2002 | Vail, III |
| 6,412,555 | B1 | 7/2002 | Sten-Halvorsen et al. |
| 6,422,312 | B1 | 7/2002 | Delatorre et al. |
| 6,424,919 | B1 | 7/2002 | Moran et al. |
| 6,434,435 | B1 | 8/2002 | Tubel et al. |
| 6,442,445 | B1 | 8/2002 | Bunkofske et al. |
| 6,516,293 | B1 | 2/2003 | Huang et al. |
| 6,549,879 | B1 | 4/2003 | Cullick et al. |
| 6,584,368 | B2 | 6/2003 | Bunkofske et al. |
| 6,609,079 | B1 | 8/2003 | Seitlinger |
| 6,678,569 | B2 | 1/2004 | Bunkofske et al. |
| 6,701,514 | B1 | 3/2004 | Haswell et al. |
| 6,823,296 | B2 | 11/2004 | Rey-Fabret et al. |
| 6,826,483 | B1 | 11/2004 | Anderson et al. |
| 6,853,921 | B2 | 2/2005 | Thomas et al. |
| 6,871,118 | B2 | 3/2005 | Henriot et al. |
| 6,954,737 | B2 | 10/2005 | Kalantar et al. |
| 6,980,940 | B1 | 12/2005 | Gurpinar et al. |
| 6,985,750 | B1 | 1/2006 | Vicknair et al. |
| 7,047,170 | B2 | 5/2006 | Feldman et al. |
| 7,054,752 | B2 | 5/2006 | Zabalza-Mezghani et al. |
| 7,062,420 | B2 | 6/2006 | Poe, Jr. |
| 7,072,809 | B2 | 7/2006 | Egermann et al. |
| 7,079,952 | B2 | 7/2006 | Thomas et al. |
| 7,096,092 | B1 | 8/2006 | Ramakrishnan et al. |
| 7,266,456 | B2 | 9/2007 | De Guzman et al. |
| 7,277,836 | B2 | 10/2007 | Netemeyer et al. |
| 7,373,976 | B2 | 5/2008 | Casey |
| 2002/0049625 | A1 | 4/2002 | Kilambi et al. |
| 2003/0028325 | A1 | 2/2003 | Roggero et al. |
| 2003/0139916 | A1 | 7/2003 | Choe et al. |
| 2003/0167157 | A1 | 9/2003 | Mougin et al. |
| 2004/0104027 | A1 | 6/2004 | Rossi et al. |
| 2004/0138862 | A1 | 7/2004 | Hu et al. |
| 2004/0148147 | A1 | 7/2004 | Martin |
| 2004/0153437 | A1 | 8/2004 | Buchan |
| 2004/0220790 | A1 | 11/2004 | Cullick et al. |
| 2004/0230413 | A1 | 11/2004 | Chen |
| 2004/0236553 | A1 | 11/2004 | Chen et al. |
| 2005/0010384 | A1 | 1/2005 | Rheem et al. |
| 2005/0038603 | A1 | 2/2005 | Thomas et al. |
| 2005/0096893 | A1 | 5/2005 | Feraille et al. |
| 2005/0149307 | A1 | 7/2005 | Gurpinar et al. |
| 2005/0267718 | A1 | 12/2005 | Guyaguler et al. |
| 2005/0267771 | A1 | 12/2005 | Biondi et al. |
| 2005/0273301 | A1 | 12/2005 | Huang |
| 2005/0273303 | A1 | 12/2005 | Flandrin et al. |
| 2006/0085174 | A1 | 4/2006 | Hermanthkumar et al. |
| 2006/0116856 | A1 | 6/2006 | Webb |
| 2006/0149520 | A1 | 7/2006 | Le Ravalec-Dupin et al. |
| 2007/0078637 | A1 | 4/2007 | Martin et al. |
| 2007/0112547 | A1 | 5/2007 | Ghorayeb et al. |
| 2007/0179766 | A1 | 8/2007 | Cullick et al. |
| 2007/0179767 | A1 | 8/2007 | Cullick et al. |
| 2007/0179768 | A1 | 8/2007 | Cullick et al. |
| 2007/0192072 | A1 | 8/2007 | Cullick et al. |
| 2007/0198223 | A1 | 8/2007 | Ella et al. |
| 2007/0271039 | A1 | 11/2007 | Ella et al. |
| 2007/0295501 | A1 | 12/2007 | Poulisse |
| 2008/0133550 | A1 | 6/2008 | Orangi et al. |

FOREIGN PATENT DOCUMENTS

| | | |
|---|---|---|
| GB | 2320731 | 7/1998 |
| WO | WO 97/41330 | 11/1997 |
| WO | WO 97/49894 | 12/1997 |
| WO | WO 98/07049 | 2/1998 |
| WO | WO 98/12417 | 3/1998 |
| WO | WO 98/37465 | 8/1998 |
| WO | WO 99/60247 | 11/1999 |
| WO | WO 02/054332 A1 | 7/2002 |
| WO | WO 02/063130 A1 | 8/2002 |
| WO | WO 02/063403 A2 | 8/2002 |
| WO | WO 02/101555 A2 | 12/2002 |
| WO | WO 2004/049216 A1 | 6/2004 |
| WO | WO 2004/079144 A2 | 9/2004 |
| WO | WO 2004/095259 A1 | 11/2004 |

OTHER PUBLICATIONS

Aminiam, K., Ameri, S., "*Application of artificial neural networks for reservoir characterization with limited data*", Journal of Petroleum Science and Engineering 49, pp. 212–222, May 20, 2005.

Barroux, C.C., et al., "*Linking Reservoir and Surface Simulators: How to Improve the Coupled Solutions,*" Society of Petroleum Engineers, SPE 65159, Copyright 2000, Abstract Only, 2 pages.

Beamer et al., "*Form Pore To Pipeline, Field Scale Solutions*"; Oilfield Review, vol. 10, No. 2, 1998, XP000961345, pp. 2–19 (18 pages).

Beliakova, N., et al., "*Hydrocarbon Field Planning Tool for Medium to Long Term Production Forecasting from Oil and Gas Fields Using Integrated Subsurface—Surface Models,*" Society of Petroleum Engineers, SPE 65160, Copyright 2000, 5 pages.

Bogaert, et al., "*Improving Oil Production Using Smart Fields Technology in the SF30 Satellite Oil Development Offshore Malaysia,*" OTC 16162, Offshore Technology Conference, Copyright 2004, pp. 1–7 (7 pages).

Brochure, Landmark: A Halliburton Company, Corporate Data Archiver™, Copyright 2003, 4 pages.

Bruheim, Bjarte, "*Data Management—A Key to Cost Effective B&P*", Offshore, Dec. 1987.

Bruni, et al., "*A Technically Rigorous and Fully Automated System for Performance Monitoring and Production Test Validation*", SPE 84881, Society of Petroleum Engineers, Copyright 2003, pp. 1–10 (10 pages).

Caers, Jef, "*Efficient gradual deformation using a streamline–based proxy method*", Journal of Petroleum Science and Engineering 39 (2003), pp. 57–83.

Centilmen, A., Ertekin, T., Grader, A.S., "*Applications of Neural Networks in Multilevel Field Development*", SPE 56433, prepared for presentation at the 1999 SPE Annual Technical Conference and Exhibition, Houston, Texas, Oct. 3–6, 1999.

Clark E. Robison, "*Overcoming the Challenges Associated With the Life–Cycle Management of Multilateral Wells: Assessing Moves Toward the 'Intelligent Completion'*", SPE 38497, paper prepared for presentation at the 1997 Offshore Europe Conference, Aberdeen, Scotland, Sep. 9–12, 1997, pp. 269–276 (8 pages).

Computer Searching Results, File 351: Derwent WPI 1963–2006/UD=200703, Jan. 2008, 10 pages.

Computer Searching Results, File 8:Ei Compendex ®, 1970–2007/ Dec. W5, Jan. 2008, 22 pages.

Computer Searching Results, Search 1, File 340:Claims®/ US Patent 1950–07/Jan. 2009, Jan. 2008, 12 pages.

Computer Results, Search 2, File 340:Claims®/US Patent 1950–07/2009, Jan. 2008, 6 pages.

Cullick, et al., "*Optimizing Multiple–Field Scheduling and Production Strategy with Reduced Riski*", SPE 84239, Society of Petroleum Engineers, Copyright 2003, pp. 1–12 (12 pages).

Dashevskiy, D., Dubinsky, V., Macpherson, J.D., "*Application of Neural Networks for Predictive Control in Drilling Dynamics*", SPE 56442, prepared for presentation at the 1999 SPE Annual Technical Conference and Exhibition, Houston, Texas, Oct. 3–6, 1999.

David M. Clementz, "*Enabling Role of Information Technology: Where are the Limits?*", Offshore, Dec. 1997, p. 42 (1 page).

Deutman, Robert, et al., "*A Case Study of Integrated Gas Field System Modelling in the North Sea Environment,*" Society of Petroleum Engineers, SPE 38556, Copyright 1997, Abstract Only, 2 pages.

Dick Ghiselin, "*New Technology, New Techniques, Set the Pace for Success*", Hart's Petroleum Engineer International, Jan. 1998, pp. 48–49 2 pages.

Du, Yuqi, Weiss, W.W., Xu, Jianyun, Balch, R.S., Li, Dacun, "*Obtain an Optimum Artificial Neural Network Model for Reservoir Studies*", SPE 84445, prepared for presentation at the SPE Annual Technical Conference and Exhibition, Denver, Colorado, Oct. 5–8, 2003.

European Patent Office, Supplementary European Search Report for Application No. EP 04704046.4–2224, dated Oct. 25, 2006 (4 pages).

G. Botto et al., Snyopsis of "*Innovative Remote Controlled Completion for Aquila Deepwater Challenge*", JPT, Oct. 1997, originally presented at the 1996 SPE European Petroleum Conference, Milan, Italy, Oct. 22–24, 1996 (3 pages).

Guyaguler, Baris, Horne, Roland N., Rogers, Leah, Rosenzweig, Jacob J., "*Optimization of Well Placement in a Gulf of Mexico Waterflooding Project,*" SPE 63221, pp. 667–676, prepared for presentation at the 2000 SPE Annual Technical Conference and Exhibition, Dallas, Texas, Oct. 1–4, 2000.

Halliburton Energy Services, Inc., "*SmartWell Technology Asset Management of the Future*", Aug. 1998 (6 pages).

Halliburton, Drilling, Evaluation and Digital Solutions, Landmark, The Role and Development of the Operational Asset Optimization Model Within DecisionSpace for Production Solutions, White Paper, May 2007, 16 pages.

Haugen, E.D., et al., "*Simulation of Independent Reservoirs Couled by Global Production and Injection Constraints,*" Society of Petroleum Engineers, SPE 29106, Copyright 1995, Abstract Only, 2 pages.

He, B., Kochhar, A.K., "*An expert system for the diagnosis and control of manufacturing processes*", International Conference on Computer Aided Production Engineering, Nov. 1988.

He, Xin–Gui, Xu, Shao–Hua, "*Process Neural Network with Time–Varied Input and Output Functions and its Applications,*" Ruan Jian Xue Bao/Journal of Software, v. 14, n. 4, Apr. 2003. p. 764–769.

Hepguler, Gokhan, "*Integration of a Field Surface and Production Network With a Reservoir Simulator,*" SPE Computer Applications, vol. 12, No. 4, SPE 38937, Jun. 1997, Abstract Only, 3 pages.

Ian C. Phillips, "*Reservoir Management of the Future*", Halliburton M&S Ltd., Aberdeen, Scotland, paper presented at EU Thermie Conference, Apr. 1997, Aberdeen, Scotland, pp. 1–15.

Johnson, Virginia M., Ammer, James R., Trick, Mona D., "*Improving Gas Storage Development Planning Through Simulation–Optimization*", SPE 65639, prepared for presentation at the 2000 SPE Eastern Regional Meeting, Morgantown, West Virginia, Oct. 17–19, 2000.

KBR Enterprise—Client RTO Portal, RTO Portal User Manual, Version 1, Dec. 2002, 91 pages.

Ken R. LeSuer, "*Breakthrough Productivity—Our Ultimate Challenge*", Offshore, Dec. 1987 (1 page).

Laplante, Phillip, "*It Isn't Your Fathers Realtime Anymore,*" System Performance, vol. 4, No. 1, Feb. 2006, 3 pages.

Liao, TonyTianlu, et al., "*Evaluating Operation Strategies via Integrated Asset Modeling,*" society of Petroleum Engineers, SPE 75525, Copyright 2002, Abstract Only, 2 pages.

Litvak, et al., "*Prudhoe Bay E–field Production Optimization System Based on Integrated Reservoir and Facility Simulation*", SPE 77643, Society of Petroleum Engineers, Copyright 2002, pp. 1–11 (11 pages).

Litvak, M.L., et al., "*Simplified Phase–Equilibrium Calculations in Integrated Reservoir and Surface–Pipeline–Network Models,*" SPE Journal, vol. 5, No. 2, SPE 64498, Jun. 2000, pp. 236–241, Abstract Only, 3 pages.

Litvak, M.L., et al., "*Surface Network and Well Tubing head Pressure Constraints in Compositional Simulation,*" Society of Petroleum Engineers, SPE 29125, Copyright 1995, Abstract Only, 2 pages.

Lobato–Barrads, Gerardo, et al., "*Integrated Compositional Surface–Subsurface Modeling for Rate Allocation Calculations,*" Society of Petroleum Engineers, SPE 74382, Copyright 2002, Abstract Only, 1 page.

Marsh, Jack, et al., "*Wildcat Hills Gas Gathering System Case Studies: An Integrated Approach From Reservoir Development Through to Sales Pipeline Delivery,*" Society of Petroleum Engineers, SPE 75698, Copyright 2002, 13 pages.

Mohaghegh, Shahab D., "*Recent Developments in Application of Artificial Intelligence in Petroleum Engineering*", Journal of Petroleum Technology, v. 57, n. 4, Apr. 2005, pp. 86–91.

Neupert, Dirk, Schlee, Michael, Simon, Ewald, "*MODI–an expert system supporting reliable, economical power plant control*", ABB Review, Jan. 1994.

Notification of Transmittal of the International Search Report or the Declaration (3 pages) and International Search Report (4 pages) for International Application No. PCT/US 00/19443, dated Nov. 14, 2000.

Oberwinkler, Christian, Ruthammer, Gerhard, Zangl, Georg, Economides, Michael , "*New Tools for Fracture Design Optimization*", SPE 86467, prepared for presentation at the SPE International Symposium and Exhibition on Formation Damage Control, Lafayette, Louisiana, Feb. 18–20, 2004.

Oberwinkler, Christian, Stundner, Michael, "*From Real Time Data to Production Optimization*", SPE 87008, prepared for presentation at the SPE Asia Pacific Conference on Integrated Modelling for Asset Management, Kuala Lumpur, Malaysia, Mar. 29–30, 2004.

Pieters, Johan, et al., "*Total System Modelling—A Tool for Effective Reservoir Management of Multiple Fields with Shared Facilities,*" Society of Petroleum Engineers, SPE 30442, Copyright 1995, Abstract Only, 2 pages.

Remery, George R., "*Reshaping Development Opportunities*", and Harris, David, "*Training and Cooperation Critical to Deepwater Future*", Offshore, Dec. 1997, p. 44.

Rommetveit, Rolv, Vefring, E.H., Wang, Zhihua, Bieseman, Taco, Faure, A.M., "*A Dynamic Model for Underbalanced Drilling With Coiled Tubing,*" SPE/IADC 29363, paper prepared for presentation at the 1995 SPE/IADC Drilling Conference, Amsterdam, Feb. 28–Mar. 2, 1995.

S. Hsieh and C.–C. Chiang, "Manufacturing–to–Sale Planning Model for Fuel Oil Production," *The International Journal of Advanced Manufacturing Technology,* 2001, 18:303–311.

Safley et al., "*Projects Implement Management Plans*", The American Oil & Gas Reporter, vol. 41, No. 9, Sep. 1998, XP000957690, pp. 136, 138–142 (6 pages).

Sengul, Mahmut, Bekkousha, Miloud A., "*Applied Production Optimization: i–Field*", SPE 77608, prepared for presentation at the SPE Annual Technical Conference and Exhibition, San Antonio, Texas, Sep. 29–Oct. 2, 2002.

Sheila Popov, "*Two Emerging Technologies Enhance Reservoir Management*", Hart's Petroluem Engineer International, Jan. 1998, pp. 43 and 45 (2 pages).

Smith et al., "*The Road Ahead To Real–Time Oil And Gas Reservoir Management*", Trans. Inst. Chem. Eng., vol. 76, No. A5, Jul. 1998, XP000957748, pp. 539–552 18 pages.

Stundner, M., Al–Thuwaini, J.S., "*How Data–Driven Modelling Methods like Neural Networks can help to integrate different Types of Data into Reservoir Management*", SPE 68163, prepared for presentation at the 2001 SPE Middle East Oil Show, Bahrain, Mar. 17–20, 2001.

Sung, Andrew H., "*Applications of soft computing in petroleum engineering*", SPIE vol. 3812, Part of the SPIE Conference on Applications and Science of Neural Networks, Fuzzy Systems, and Evolutionary Computation II, Denver, Colorado, Jul. 1999.

Thomas R. Bates, Jr., "*Technology Pace Must Accelerate to Counter Oilfield Inflation*", Offshore, Dec. 1987 (1 page).

Tingas, John, "*Integrated Reservoir and Surface Network Simulation in Reservoir Management of Southern North Sea Gas Reservoirs,*" Society of Petroleum Engineers, SPE 50635, Copyright 1998, Abstract Only, 2 pages.

Trick, M.D., "*A Different Approach to Coupling a Reservoir Simulator with a Surface Facilities,*" Society of Petroleum Engineers, SPE 40001, Copyright 1998, Abstract Only, 1 page.

Tulsa Petroleum Abstracts, Keyboard Search Results (Abstracts 1–113), 212 pages, various authors and dates.

U.S. Application Accelerated Examination U.S. Appl. No. 12/121,710, filed May 15, 2008, entitled "Dynamic Production System Management", inventors Richard G. Ella et al. (continuation of 16689–004001).

Vinje, "*Reservoir Control Using Smart Wells*", 10$^{th}$ Underwater Technology Conference Proceedings, Mar. 25–26, 1998, XP000957692, 9 pages.

Webpage, Landmark: A Halliburton Company, "*Calendar of Innovations 2003*", Apr. 2003—Decision Space™—Decision Management System, mhtml:file://C:\Documents%20and%20Settings\jyg.FRDOMAIN\Local%20Settings\Tempo..., printed Jun. 6, 2004, 2 pages.

Webpage, Landmark: A Halliburton Company, "*Calendar of Innovations 2003*", May 2003—Decision Space Asset Planner™, mhtml:file://C:\Documents%20and%20Settings\jyg.FRDOMAIN\Local%20Settings\Tempo..., printed Jun. 6, 2004, 2 pages.

Weisenborn, A.J. (Toon), et al., "*Compositional Integrated Subsurface–Surface Modeling,*" Society of Petroleum Engineers, SPE 65158, Copyright 2000, Abstract Only, 2 pages.

Yeten, B., Castellini, A., Guyaguler, C., Chen, W.H., "*A Comparison Study on Experimental Design and Response Surface Methodologies*", SPE 93347, prepared for presentation at the 2005 SPE Reservoir Simulation Symposium in Houston, Texas, Jan. 31–Feb. 2, 2005.

Yeten, Burak, Durlofsky, Louis J., Aziz, Khalid, "*Optimization of Nonconventional Well Type, Location, and Trajectory*", SPE 86880, SPE Journal, Sep. 2003, pp. 200–210.

Zapata, V.J., et al., "*Advances in Tightly Coupled Reservoir/Wellbore/Surface–Network Simulation,*" SPE Reservoir Evaluation & Engineering, vol. 4, No. 2, SPE 71120, Apr. 2001, pp. 114–120, Abstract Only, 3 pages.

International Search Report dated Nov. 14, 2000 for PCT/US00/19443.

Notification of Transmittal of the International Search Report and the Written Opinion of the international Searching Authority, or the Declaration (1 page), International Search Report (3 pages), and Written Opinion of the International Searching Authority (4 pages) for International Application No. PCT/US04/01534 mailed Dec. 14, 2005.

SYSTEM AND METHOD FOR REAL TIME RESERVOIR MANAGEMENT

Matter enclosed in heavy brackets [ ] appears in the original patent but forms no part of this reissue specification; matter printed in italics indicates the additions made by reissue.

[The present application is a continuation of U.S. patent application Ser. No. 09/976,573, filed Oct. 12, 2001 now U.S. Pat. No. 6,853,921 which is a continuation-in-part of U.S patent application Ser. No. 09/816,044 now U.S. Pat. No. 6,356,844, filed Mar. 23, 2001 which is a continuation of Ser. No. 09/357,426 now U.S. Pat. No. 6,266,619, filed Jul. 20, 1999, all of which are hereby incorporated by reference in their entirety as if reproduced herein.] *This Reissue application Ser. No. 12/436,632, filed May 6, 2009, is a divisional of Reissue application Ser. No. 11/704,369, filed on Feb. 8, 2007, currently pending, both reissue applications are a reissue of U.S. application Ser. No. 10/929,584, filed Aug. 30, 2004, now U.S. Pat. No. 7,079,952, which is a continuation of U.S. patent application Ser. No. 09/976,573, filed Oct. 12, 2001 now U.S. Pat. No. 6,853,921 which is a continuation-in-part of U.S. patent application Ser. No. 09/816,044 filed Mar. 23, 2001, now U.S. Pat. No. 6,356,844, which is a continuation of U.S. patent application Ser. No. 09/357,426, filed Jul. 20, 1999, now U.S. Pat. No. 6,266,619. The disclosures of the prior applications are considered part of (and are incorporated by reference in) the disclosure of this application.*

BACKGROUND

Historically, most oil and gas reservoirs have been developed and managed under timetables and scenarios as follows: a preliminary investigation of an area was conducted using broad geological methods for collection and analysis of data such as seismic, gravimetric, and magnetic data, to determine regional geology and subsurface reservoir structure. In some instances, more detailed seismic mapping of a specific structure was conducted in an effort to reduce the high cost, and the high risk, of an exploration well. A test well was then drilled to penetrate the identified structure to confirm the presence of hydrocarbons, and to test productivity. In lower-cost onshore areas, development of a field would commence immediately by completing the test well as a production well. In higher cost or more hostile environments such as the North Sea, a period of appraisal would follow, leading to a decision as to whether or not to develop the project. In either case, based on inevitably sparse data, further development wells, both producers and injectors would be planned in accordance with a reservoir development plan. Once production and/or injection began, more dynamic data would become available, thus, allowing the engineers and geoscientists to better understand how the reservoir rock was distributed and how the fluids were flowing. As more data became available, an improved understanding of the reservoir was used to adjust the reservoir development plan resulting in the familiar pattern of recompletion, sidetracks, infill drilling, well abandonment, etc. Unfortunately, not until the time at which the field was abandoned, and when the information is the least useful, did reservoir understanding reach its maximum.

Limited and relatively poor quality of reservoir data throughout the life of the reservoir, coupled with the relatively high cost of most types of well intervention, implies that reservoir management is as much an art as a science. Engineers and geoscientists responsible for reservoir management discussed injection water, fingering, oil-water contacts rising, and fluids moving as if these were a precise process. The reality, however, is that water expected to take three years to break through to a producing well might arrive in six months in one reservoir but might never appear in another. Text book "piston like" displacement rarely happens, and one could only guess at flood patterns.

For some time, reservoir engineers and geoscientists have made assessments of reservoir characteristics and optimized production using down hole test data taken at selected intervals. Such data usually includes traditional pressure, temperature and flow data is well known in the art. Reservoir engineers have also had access to production data for the individual wells in a reservoir. Such data as oil, water and gas flow rates are generally obtained by selectively testing production from the selected well at selected intervals.

Recent improvements in the state of the art regarding data gathering, both down hole and at the surface, have dramatically increased the quantity and quality of data gathered. Examples of such state of the art improvements in data acquisition technology include assemblies run in the casing string comprising a sensor probe with optional flow ports that allow fluid inflow from the formation into the casing while sensing wellbore and/or reservoir characteristics as described and disclosed in international PCT application WO. 97/49894, assigned to Baker Hughes, the disclosure of which is incorporated herein by reference. The casing assembly may further include a microprocessor, a transmitting device, and a controlling device located in the casing string for processing and transmitting real time data. A memory device may also be provided for recording data relating to the monitored wellbore or reservoir characteristics. Examples of down hole characteristics which may be monitored with such equipment include: temperature, pressure, fluid flow rate and type, formation resistivity, cross-well and acoustic seismometry, perforation depth, fluid characteristics and logging data. Using a microprocessor, hydrocarbon production performance may be enhanced by activating local operations in additional downhole equipment. A similar type of casing assembly used for gathering data is described and illustrated in international PCT application WO 98/12417, assigned to BP Exploration Operating Company Limited, the disclosure of which is incorporated by reference.

Recent technology improvements in downhole flow control devices are disclosed in UK Patent Application GB 2,320,731A which describes a number of downhole flow control devices which may be used to shut off particular zones by using downhole electronics and programing with decision making capacity, the disclosure of which is incorporated by reference.

Another important emerging technology that may have a substantial impact on managing reservoirs is time lapsed seismic, often referred to a 4-D seismic processing. In the past, seismic surveys were conducted only for exploration purposes. However, incremental differences in seismic data gathered over time are becoming useful as a reservoir management tool to potentially detect dynamic reservoir fluid movement. This is accomplished by removing the non-time varying geologic seismic elements to produce a direct image of the time-varying changes caused by fluid flow in the reservoir. By using 4-D seismic processing, reservoir engineers can locate bypassed oil to optimize infill drilling and flood pattern. Additionally, 4-D seismic processing can be used to enhance the reservoir model and history match flow simulations.

International PCT application WO 98/07049, assigned to Geo-Services, the disclosure of which is incorporated herein by reference, describes and discloses state of the art seismic technology applicable for gathering data relevant to a producing reservoir. The publication discloses a reservoir monitoring system comprising: a plurality of permanently coupled remote sensor nodes, wherein each node comprises a plurality of seismic sensors and a digitizer for analog signals; a concentrator of signals received from the plurality of permanently coupled remote sensor nodes; a plurality of remote transmission lines which independently connect each of the plurality of remote sensor nodes to the concentrator, a recorder of the concentrated signals from the concentrator, and a transmission line which connects the concentrator to the recorder. The system is used to transmit remote data signals independently from each node of the plurality of permanently coupled remote sensor nodes to a concentrator and then transmit the concentrated data signals to a recorder. Such advanced systems of gathering seismic data may be used in the reservoir management system of the present invention as disclosed hereinafter in the Detailed Description section of the application.

Historically, down hole data and surface production data has been analyzed by pressure transient and production analysis. Presently, a number of commercially available computer programs such as Saphir and PTA are available to do such an analysis. The pressure transient analysis generates output data well known in the art, such as permeability-feet, skin, average reservoir pressure and the estimated reservoir boundaries. Such reservoir parameters may be used in the reservoir management system of the present invention.

In the past and present, geoscientists, geologists and geophysicists (sometimes in conjunction with reservoir engineers) analyzed well log data, core data and SDL data. The data was and may currently be processed in log processing/interpretation programs that are commercially available, such as Petroworks and DPP. Seismic data may be processed in programs such as Seisworks and then the log data and seismic data are processed together and geostatistics applied to create a geocellular model.

Presently, reservoir engineers may use reservoir simulators such as VIP or Eclipse to analyze the reservoir. Nodal analysis programs such as WEM, Prosper and Openflow have been-used in conjunction with material balance programs and economic analysis programs such as Aries and ResEV to generate a desired field wide production forecast. Once the field wide production has been forecasted, selected wells may be produced at selected rates to obtain the selected forecast rate. Likewise, such analysis is used to determine field wide injection rates for maintenance of reservoir pressure and for water flood pattern development. In a similar manner, target injection rates and zonal profiles are determined to obtain the field wide injection rates.

It is estimated that between fifty and seventy percent of a reservoir engineer's time is spent manipulating data for use by each of the computer programs in order for the data gathered and processed by the disparate programs (developed by different companies) to obtain a resultant output desired field wide production forecast. Due to the complexity and time required to perform these functions, frequently an abbreviated incomplete analysis is performed with the output used to adjust a surface choke or recomplete a well for better reservoir performance without knowledge of how such adjustment will affect reservoir management as a whole.

SUMMARY OF THE INVENTION

The present invention comprises a field wide management system for a petroleum reservoir on a real time basis. Such a field wide management system includes a suite of tools (computer programs) that seamlessly interface with each other to generate a field wide production and injection forecast. The resultant output of such a system is the real time control of downhole production and injection control devices such as chokes, valves and other flow control devices and real time control of surface production and injection control devices. Such a system and method of real time field wide reservoir management provides for better reservoir management, thereby maximizing the value of the asset to its owner.

BRIEF DESCRIPTION OF THE DRAWINGS

The disclosed invention will be described with reference to the accompanying drawings, which show important sample embodiments of the invention and which are incorporated in the specification hereof by reference. A more complete understanding of the present invention may be had by reference to the following Detailed Description when taken in conjunction with the accompanying drawings, wherein:

FIG. 4 is a generalized diagrammatic illustration of one exemplary embodiment of the system of FIG. 4;

DETAILED DESCRIPTION

Figure 1:
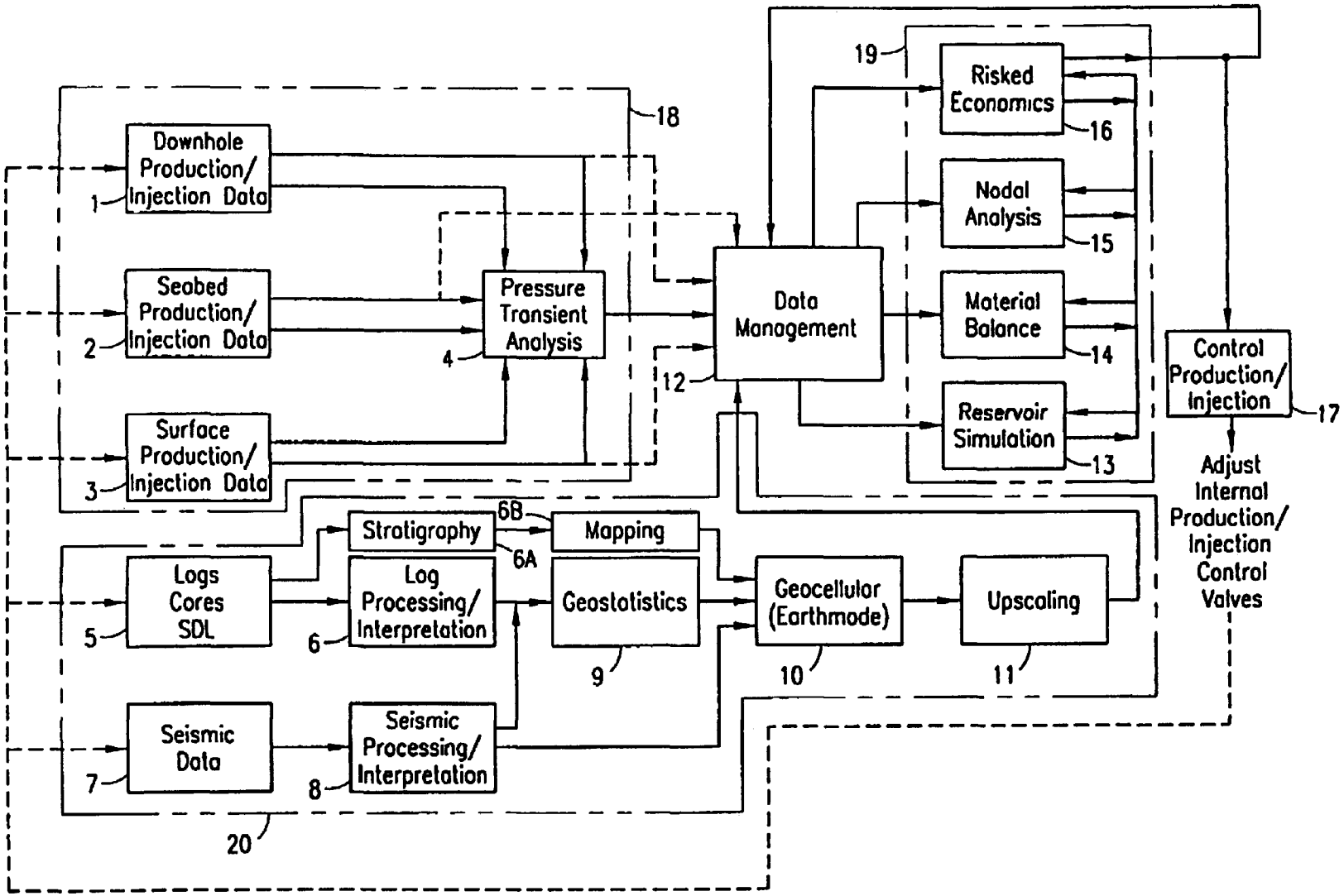
FIG. 1 is a block diagram of the method of field wide reservoir management of the present invention.

Reference is now made to the Drawings wherein like reference characters denote like or similar parts throughout the Figures.

Figure 4:
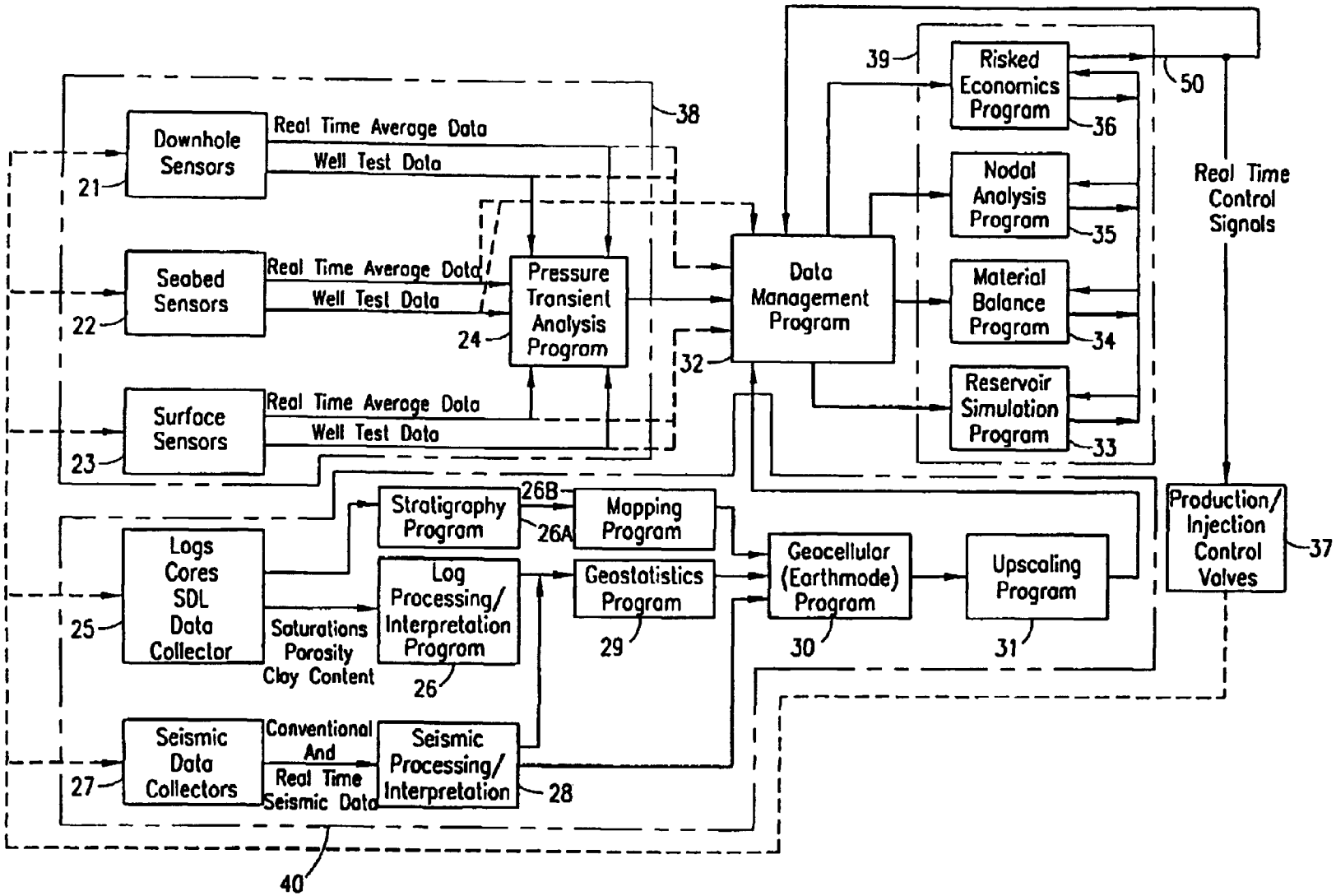
FIG. 4 is a block diagram of the system of real time reservoir management of the present invention.

Referring now to FIGS. 1 and 4, the present invention comprises a method and system of real time field wide reservoir management. Such a system includes a suite of tools (computer programs of the type listed in Table 1) that seamlessly interface with each other in accordance with the method to generate a field wide production and injection forecast. It will be understood by those skilled in the art that the practice of the present invention is not limited to the use of the programs disclosed in Table 1. Programs listed in Table 1 are merely some of the programs presently available for practice of the invention.

Figure 2:
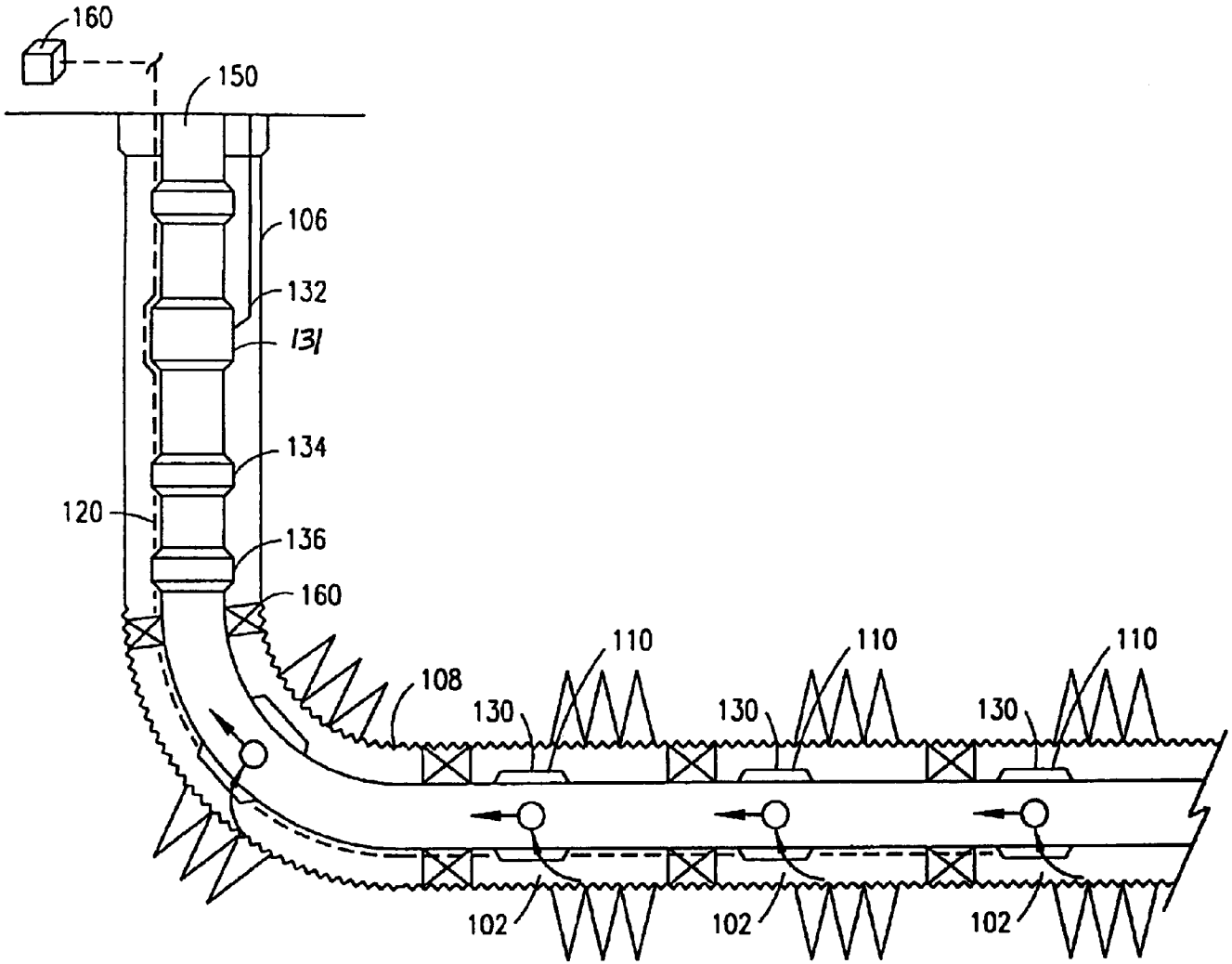
FIG. 2 is a cross section view of a typical well completion system that may be used in the practice of the present invention.
Figure 3:
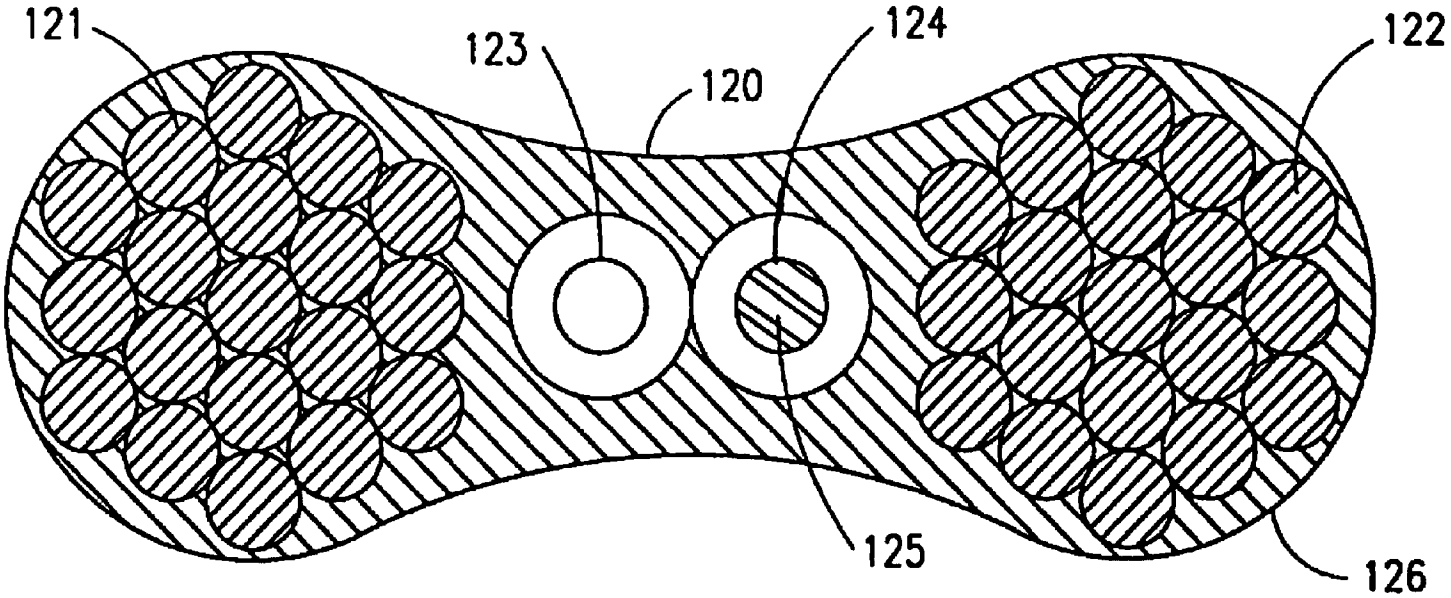
FIG. 3 is a cross section of a flat back cable that may be used to communicate data from sensors located in a wellbore to the data management and analysis functions of the present invention and communicate commands from the reservoir management system of the present invention to adjust downhole well control devices.

The resultant output of the system and method of field wide reservoir management is the real time control of downhole production and injection control devices such as chokes, valves, and other flow control devices (as illustrated in FIGS. 2 and 3 and otherwise known in the art) and real time control of surface production and injection control devices (as known in the art). The real time control described herein need not necessarily be instantaneous, but can be delayed depending on how the control is communicated to the downhole production and injection control devices. Field wide reservoir management does not require that every well in a field be controlled.

Efficient and sophisticated "field wide reservoir data" is necessary for the method and system of real time reservoir management of the present invention. Referring now to blocks 1, 2, 3, 5 and 7 of FIG. 1, these blocks represent some of the types of "field wide reservoir data" acquired generally through direct measurement methods and with devices as discussed in the background section, or by methods well known in the art, or as hereinafter set forth in the specification. It will be understood by those skilled in the art that it is not necessary for the practice of the subject invention to have all of the representative types of data, data collection devices and computer programs illustrated and described in this specification and the accompanying Figures, nor is the present invention limited to the types of data, data collection devices and computer programs illustrated herein. As discussed in the background section, substantial advancements have been made and are continuing to be made in the quality and quantity of data gathered.

In order to provide for more efficient usage of "field wide reservoir data", the data may be divided into two broad areas: production and/or injection (hereinafter "production/injection") data and geologic data. Production/injection data includes accurate pressure, temperature, viscosity, flow rate and compositional profiles made available continuously on a real time basis or, alternatively, available as selected well test data or daily average data.

Referring to box 18, production/injection data may include downhole production data 1, seabed production data 2 and surface production data 3. It will be understood that the present invention may be used with land based petroleum reservoirs as well as subsea petroleum reservoirs. Production/injection data is pre-processed using pressure transient analysis in computer programs such as Saphir by Kappa Engineering or PTA by Geographix to output reservoir permeability, reservoir pressure, permeability-feet and the distance to the reservoir boundaries.

Referring to box 20, geologic data includes log data, core data and SDL data represented by block 5 and seismic data represented by block 7. Block 5 data is pre-processed as illustrated in block 6 using such computer programs such as Petroworks by Landmark Graphics, Prizm by Geographix and DPP by Halliburton to obtain water and oil saturations, porosity, and clay content. Block 5 data is also processed in stratigraphy programs as noted in block 6A by programs such as Stratworks by Landmark Graphics and may be further pre-processed to map the reservoir as noted in block 6B using a Z-Map program by Landmark Graphics.

Geologic data also includes seismic data block 7 that may be conventional or real time 4D seismic data (as discussed in the background section). Seismic data may be collected conventionally by periodically placing an array of hydrophones and geophones at selected places in the reservoir or 4D seismic may be collected on a real time basis using geophones placed in wells. Block 7 seismic data is processed and interpreted as illustrated in block 8 by such programs as Seisworks and Earthcube by Landmark Graphics to obtain hydrocarbon indicators, stratigraphy and structure.

Output from blocks 6 and 8 is further pre-processed as illustrated in block 9 to obtain geostatistics using Sigmaview by Landmark Graphics. Output from blocks 8, 9 and 6B are input into the Geocellular (Earthmode) programs illustrated by block 10 and processed using the Stratamodel by Landmark Graphics. The resultant output of block 10 is then upscaled as noted in block 11 in Geolink by Landmark Graphics to obtain a reservoir simulation model.

Output from upscaling 11 is input into the data management function of block 12. Production/injection data represented by downhole production 1, seabed production 2 and surface production 3 may be input directly into the data management function 12 (as illustrated by the dotted lines) or pre-processed using pressure transient analysis as illustrated in block 4 as previously discussed. Data management programs may include Openworks, Open/Explorer, TOW/cs and DSS32, all available from Landmark Graphics and Finder available from Geoquest.

Referring to box 19 of FIG. 1, wherein there is disclosed iterative processing of data gathered by and stored in the data management program. Reservoir simulation may be accomplished by using data from the data management function 12 using VIP by Landmark Graphics or Eclipse by Geoquest. Material Balance calculations may be performed using data from the reservoir simulation 13 and data management function 12 to determine hydrocarbon volumes, reservoir drive mechanisms and production profiles, using MBAL program of Petroleum Experts.

Nodal Analysis 15 may be performed using the material balance data output of 14 and reservoir simulation data of 13 and other data such as wellbore configuration and surface facility configurations to determine rate versus pressure for various system configurations and constraints using such programs as WEM by P. E. Moseley and Associates, Prosper by Petroleum Experts, and Openflow by Geographix.

Risked Economics 16 may be performed using Aries or ResEV by Landmark Graphics to determine an optimum field wide production/injection rate. Alternatively, the target field wide production/injection rate may be fixed at a predetermined rate by factors such as product (oil and gas) transportation logistics, governmental controls, gas, oil or water processing facility limitations, etc. In either scenario, the target field wide production/injection rate may be allocated back to individual wells.

After production/injection for individual wells is calculated the reservoir management system of the present invention generates and transmits a real time signal used to adjust one or more interval control valves located in one or more wells or adjust one or more subsea control valves or one or more surface production control valves to obtain the desired flow or injection rate. As above, transmission of the real time signal is not necessarily instantaneous, and can be delayed depending on the communication method. For example, the reservoir management system may signal an operator to adjust a valve. The operator may then travel into the field to make the adjustment or may telephone another operator near the valve to make the adjustment. Also, it will be understood by those skilled in the art that an inter-relationship exists between the interval control valves. When one is opened, another may be closed. The desired production rate for an individual well may be input directly back into the data management function 12 and actual production from a well is compared to the target rate on a real time basis. The system may include programming for a band width of acceptable variances from the target rate such that an adjustment is only performed when the rate is outside the set point.

Opening or closing a control valve 17 to the determined position may have an almost immediate effect on the production/injection data represented by blocks 1, 2, 3; however, on a long term basis the reservoir as a whole is impacted and geologic data represented by blocks 5 and 7 will be affected (See dotted lines from control valve 17). The present invention continually performs iterative calculations as illustrated in box 19 using reservoir simulation 13, material balance 14, nodal analysis 15 and risked economics 16 to continuously calculate a desired field wide production rate and provide real time control of production/injection control devices.

The method on field wide reservoir management incorporates the concept of "closing the loop" wherein actual production data from individual wells and on a field basis.

To obtain an improved level of reservoir performance, downhole controls are necessary to enable reservoir engineers to control the reservoir response much like a process engineer controls a process facility. State of the art sensor and control technology now make it realistic to consider systematic development of a reservoir much as one would develop and control a process plant. An example of state of the art computers and plant process control is described in PCT application WO 98/37465 assigned to Baker Hughes Incorporated.

In the system and method of real time reservoir management of the present invention, the reservoir may be broken into discreet reservoir management intervals—typically a group of sands that are expected to behave as one, possibly with shales above and below. Within the wellbore, zonal isolation packers may be used to separate the producing and/or injection zones into management intervals. An example reservoir management interval might be 30 to 100 feet. Between zonal isolation packers, variable chokes may be used to regulate the flow of fluids into or out of the reservoir management interval.

U.S. Pat. No. 5,547,029 by Rubbo, the disclosure of which is incorporated by reference, discloses a controlled reservoir analysis and management system that illustrates equipment and systems that are known in the art and may be used in the practice of the present invention. Referring now to FIG. 2, one embodiment of a production well having downhole sensors and downhole control that has been successfully used in the Norwegian sector of the North Sea, the Southern Adriatic Sea and the Gulf of Mexico is the "SCRAMSJ" concept. It will be understood by those skilled in the art that the SCRAMSJ concept is one embodiment of a production well with sensors and downhole controls that may be used in practicing the subject invention. However, practice of the subject invention is not limited to the SCRAMSJ concept.

SCRAMSJ is a completion system that includes an integrated data-acquisition and control network. The system uses permanent downhole sensors and pressure-control devices as well known in the art that are operated remotely through a control network from the surface without the need for traditional well-intervention techniques. As discussed in the background section, continuous monitoring of downhole pressure, temperatures, and other parameters has been available in the industry for several decades, the recent developments providing for real-time subsurface production and injection control create a significant opportunity for cost reductions and improvements in ultimate hydrocarbon recovery. Improving well productivity, accelerating production, and increasing total recovery are compelling justifications for use of this system.

As illustrated in FIG. 2, the components of the SCRAMSJ System 100 may include:

(a) one or more interval control valves 110 which provide an annulus to tubing flow path 102 and incorporates sensors 130 for reservoir data acquisition. The system 100 and the interval control valve 110 includes a choking device that isolate the reservoir from the production tubing 150. It will be understood by those skilled in the art that there is an inter-relationship between one control valve and another as one valve is directed to open another control valve may be directed to close;

(b) an HF Retrievable Production Packer 160 provides a tubing-to-casing seal and pressure barrier, isolates zones and/or laterals from the well bore 108 and allows passage of the umbilical 120. The packer 160 may be set using one-trip completion and installation and retrieval. The packer 160 is a hydraulically set packer that may be set using the system data communications and hydraulic power components. The system may also include other components as well known in the industry including SCSSV 131, SCSSV control line 132, gas lift device 134, and disconnect device 136. It will be understood by those skilled in the art that the well bore log may be cased partially having an open hole completion or may be cased entirely. It will also be understood that the system may be used in multilateral completions;

(c) SEGNETJ Protocol Software is used to communicate with and power the SCRAMSJ system. The SEGNETJ software, accommodates third party products and provides a redundant system capable of by-passing failed units on a bus of the system;

(d) a dual flatback umbilical 120 which incorporates electro/hydraulic lines provides SEGNET communication and control and allows reservoir data acquired by the system to be transmitted to the surface.

Referring to FIG. 3, the electro and hydraulic lines are protected by combining them into a reinforced flatback umbilical 120 that is run external to the production-tubing string (not shown). The flatback 120 comprises two galvanized mild steel bumber bars 121 and 122 and an incolony ¼ inch tube 123 and 124. Inside tube 124 is a copper conductor 125. The flatback 120 is encased in a metal armor 126; and (e) a surface control unit 160 operates completion tools, monitors the communications system and interfaces with other communication and control systems. It will be understood that an interrelationship exists between flow control devices as one is directed to open another may be directed to close.

A typical flow control apparatus for use in a subterranean well that is compatible with the SCRAMSJ system is illustrated and described in pending U.S. patent application Ser. No. 08/898,567 filed Jul. 21, 1997 by inventor Brett W. Boundin, the disclosure of which is incorporated by reference.

Referring now to blocks 21, 22, 23 of FIG. 4, these blocks represent sensors as illustrated in FIG. 2, or discussed in the background section (and/or as known in the art) used for collection of data such as pressure, temperature and volume, and 4D seismic. These sensors gather production/injection data from one or more wells that includes accurate pressure, temperature, viscosity, flow rate and compositional profiles available continuously on a real time basis.

Referring to box 38, in the system of the present invention, production/injection data is pre-processed using pressure transient analysis programs 24 in computer programs such as Saphir by Kappa Engineering or PTA by Geographix to output reservoir permeability, reservoir pressure, permeability-feet and the distance to the reservoir boundaries.

Referring to box 40, geologic data including log, cores and SDL is collected with devices represented by blocks 25 and 26 as discussed in the background section, or by data sensors and collections well known in the art. Block 25 data is pre-processed as illustrated in block 26 using such computer programs Petroworks by Landmark Graphics, Prizm by Geographix and DPP by Halliburton to obtain water and oil saturations, porosity, and clay content. Block 25 data is also processed in stratigraphy programs as noted in block 26A by programs such as Stratworks by Landmark Graphics and may be further pre-processed to map the reservoir as noted in block 26B using a Z-Map program by Landmark Graphics.

Geologic data also includes seismic data obtained from collectors known in the art and represented by block 27 that may be conventional or real time 4D seismic data (as discussed in the background section). Seismic data is processed and interpreted as illustrated in block 28 by such programs as Seisworks and Earthcube by Landmark Graphics to obtain hydrocarbon indicators, stratigraphy and structure.

Output from blocks 26 and 28 is further pre-processed as illustrated in block 29 to obtain geostatistics using Sigmaview by Landmark Graphics. Output from blocks 28, 29 and 26B are input into the Geocellular (Earthmodel) programs illustrated by block 30 and processed using the Stratamodel by Landmark Graphics. The resultant output of block 30 is then upscaled as noted in block 31 in Geolink by Landmark Graphics to obtain a reservoir simulation model.

Output from the upscaling program 31 is input into the data management function of block 32. Production/injection data collected by downhole sensors 21, seabed production sensors 22 and surface production sensors 23 may be input directly into the data management function 22 (as illustrated by the dotted lines) or pre-processed using pressure transient analysis as illustrated in block 22 as previously discussed. Data Management programs may include Openworks, Open/Explorer, TOW/cs and DSS32, all available from Landmark Graphics and Finder available from Geoquest.

Referring to box 39 of FIG. 4, wherein there is disclosed iterative processing of data gathered by and stored in the data management program 32. The Reservoir Simulation program 33 uses data from the data management function 32, and can use data received from the Nodal Analysis program 35 to develop its simulation. The Reservoir Simulation program 33 can also output data to the Nodal Analysis program 35. Examples of Reservoir Simulation programs include VIP by Landmark Graphics or Eclipse by Geoquest. The Material Balance program uses data from the reservoir simulation 33 and data management function 22 to determine hydrocarbon volumes, reservoir drive mechanisms and production profiles. One of the Material Balance programs known in the art is the MBAL program of Petroleum Experts.

The Nodal Analysis program 35 uses data from the Material Balance program 34 and Reservoir Simulation program 33 and other data such as wellbore configuration and surface facility configurations to determine rate versus pressure for various system configurations. Additionally, the Nodal Analysis program 35 shares information with the Reservoir simulation program 33, so that each program, Nodal Analysis 35 and Reservoir Simulation 33, may iteratively update and account for changes in the output of the other. Nodal Analysis programs include WEM by P. E. Moseley and Associates, GAP and Prosper by Petroleum Experts, and Openflow by Geographix.

Risked Economics programs 36 such as Aries or ResEV by Landmark Graphics determine the optimum field wide production/injection rate which may then be allocated back to individual wells. After production/injection by individual wells is calculated the reservoir management system of the present invention generates and transmits real time, though not necessarily instantaneous, signals (designated generally at 50 in FIG. 4) used to adjust interval control valves located in wells or adjust subsea control valves or surface production control valves to obtain the desired flow or injection rate. The desired production rate may be input directly back into the data management function 32 and actual production/injection from a well is compared to the target rate on a real time basis. Opening or closing a control valve 37 to the pre-determined position may have an almost immediate effect on the production/injection data collected by sensors represented by blocks 21, 22 and 33, however, on a long term basis, the reservoir as a whole is impacted and geologic data collected by sensors represented by blocks 25 and 27 will be affected (see dotted line from control valve 37). The present invention may be used to perform iterative calculations as illustrated in box 39 using the reservoir simulation program 23, material balance program 24, nodal analysis program 25 and risked economics program 26 to continuously calculate a desired field wide production rate and provide real time, though not necessarily instantaneous, control of production control devices.

Figure 4A:
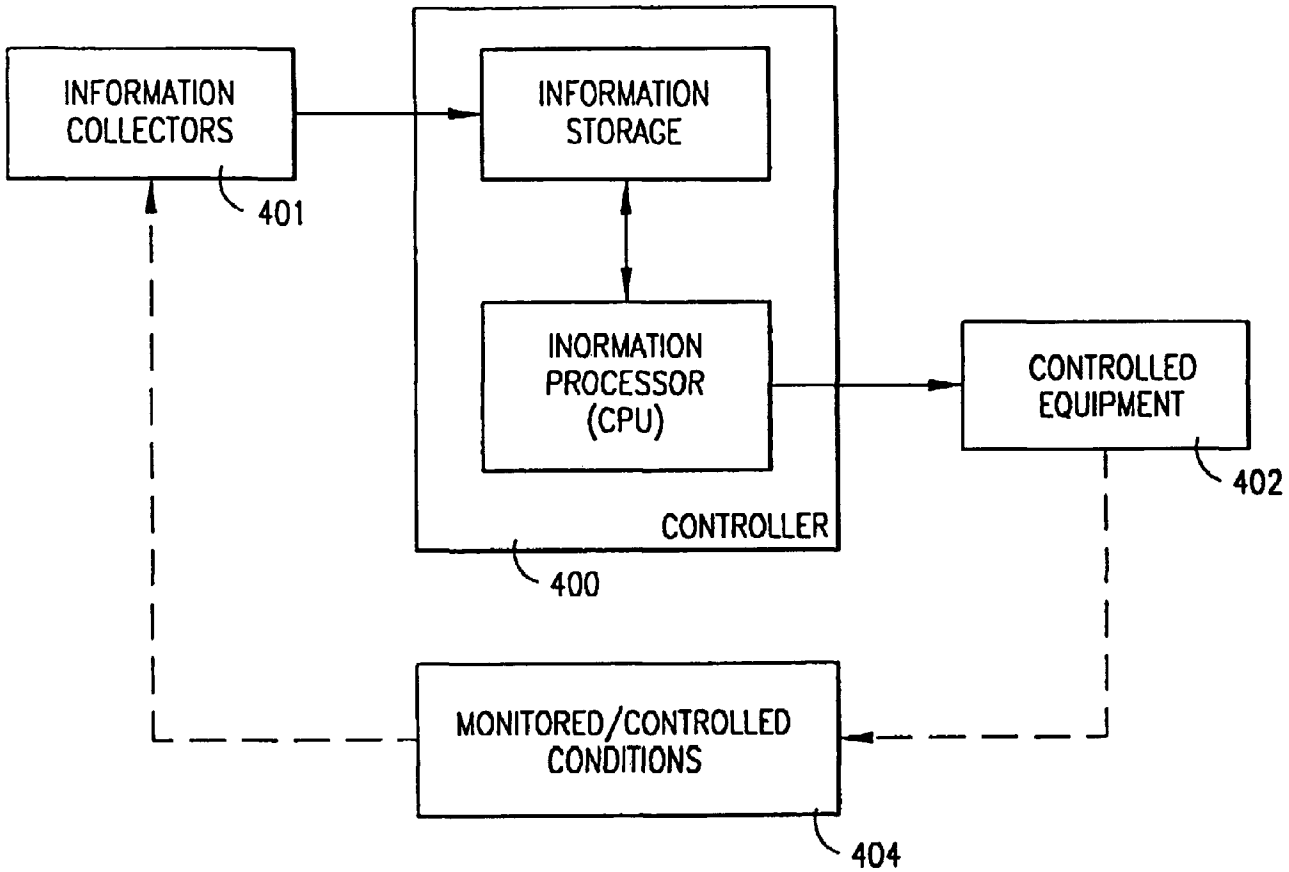

FIG. 4A is a generalized diagrammatic illustration of one exemplary embodiment of the system of FIG. 4. In particular, the embodiment of FIG. 4A includes a controller 400 coupled to receive input information from information collectors 401. The controller 400 processes the information received from information collectors 401, and provides real time, though not necessarily instantaneous, output control signals to controlled equipment 402. The information collectors 401 can include, for example, the components illustrated at 38 and 40 in FIG. 4. The controlled equipment 402 can include, for example, control valves such as illustrated at 37 in FIG. 4. The controller 400 includes information (for example, data and program) storage and an information processor (CPU). The information storage can include a database for storing information received from the information collectors 401. The information processor is interconnected with the information storage such that controller 400 is capable, for example, of implementing the functions illustrated at 32–36 in FIG. 4. As shown diagrammatically by broken line in FIG. 4A, operation of the controlled equipment 402 affects conditions 404 (for example, well-bore conditions) which are monitored by the information collectors 401.

Figure 5:
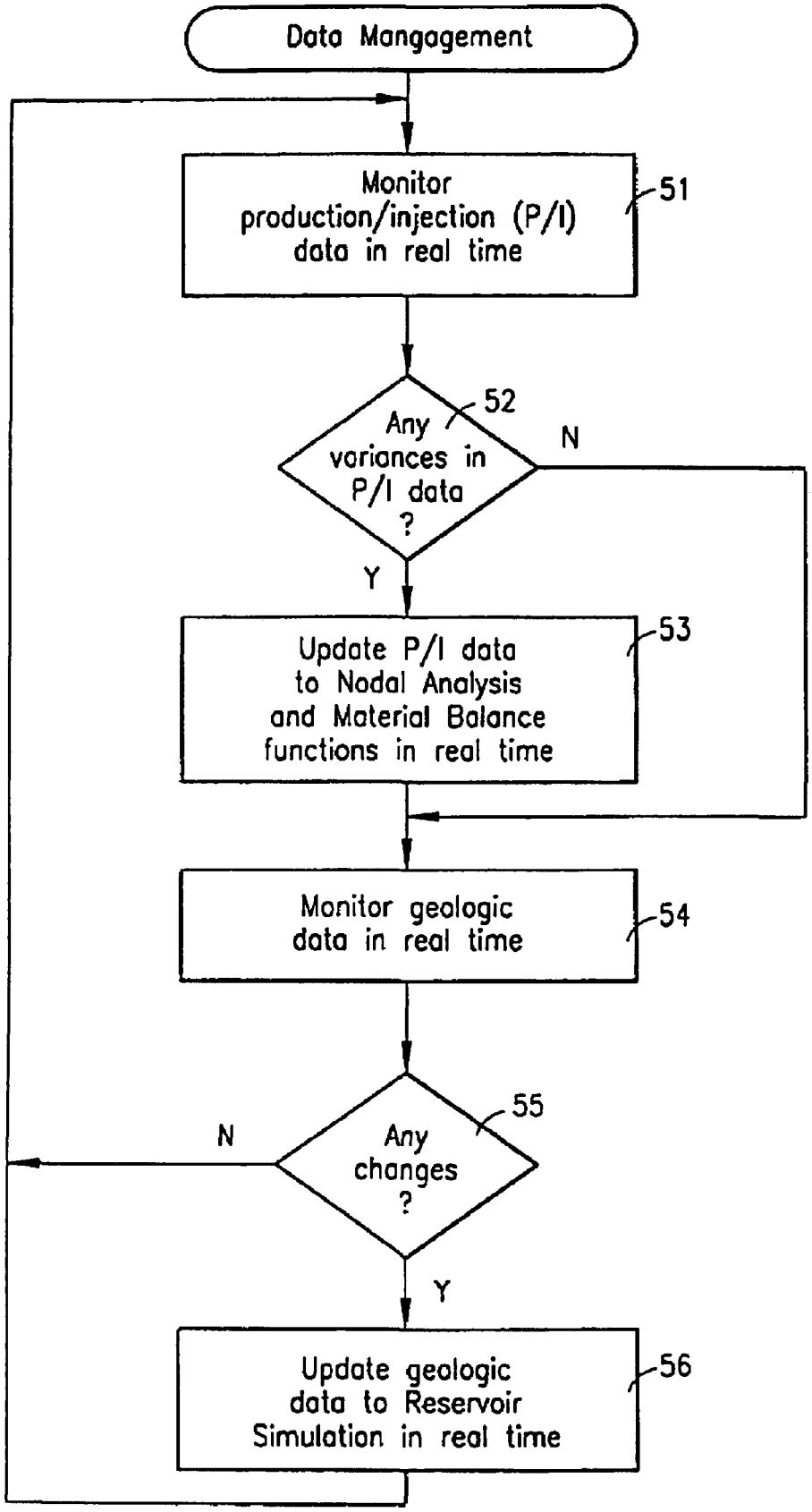
FIG. 5 illustrates exemplary operations which can be performed by the controller of FIG. 4A to implement the data management function of FIG. 4.

FIG. 5 illustrates exemplary operations which can be performed by the controller 400 of FIG. 4A to implement the data management function 32 of FIG. 4. At 51, the production/injection (P/I) data both measured (for example, from box 38 of FIG. 4) and simulated (for example, output from box 33 of FIG. 4) is monitored in real time. Any variances in the P/I data are detected at 52. If variances are detected at 52, then at 53, the new P/I data is updated in real time to the Nodal Analysis and Material Balance functions 34 and 35 of FIG. 4. At 54, geologic data, for example, from box 40 of FIG. 4, is monitored in real time. If any changes in the geologic data are detected at 55, then at 56, the new geologic data is updated in real time to the Reservoir Simulation function 33 of FIG. 4.

Figure 6:
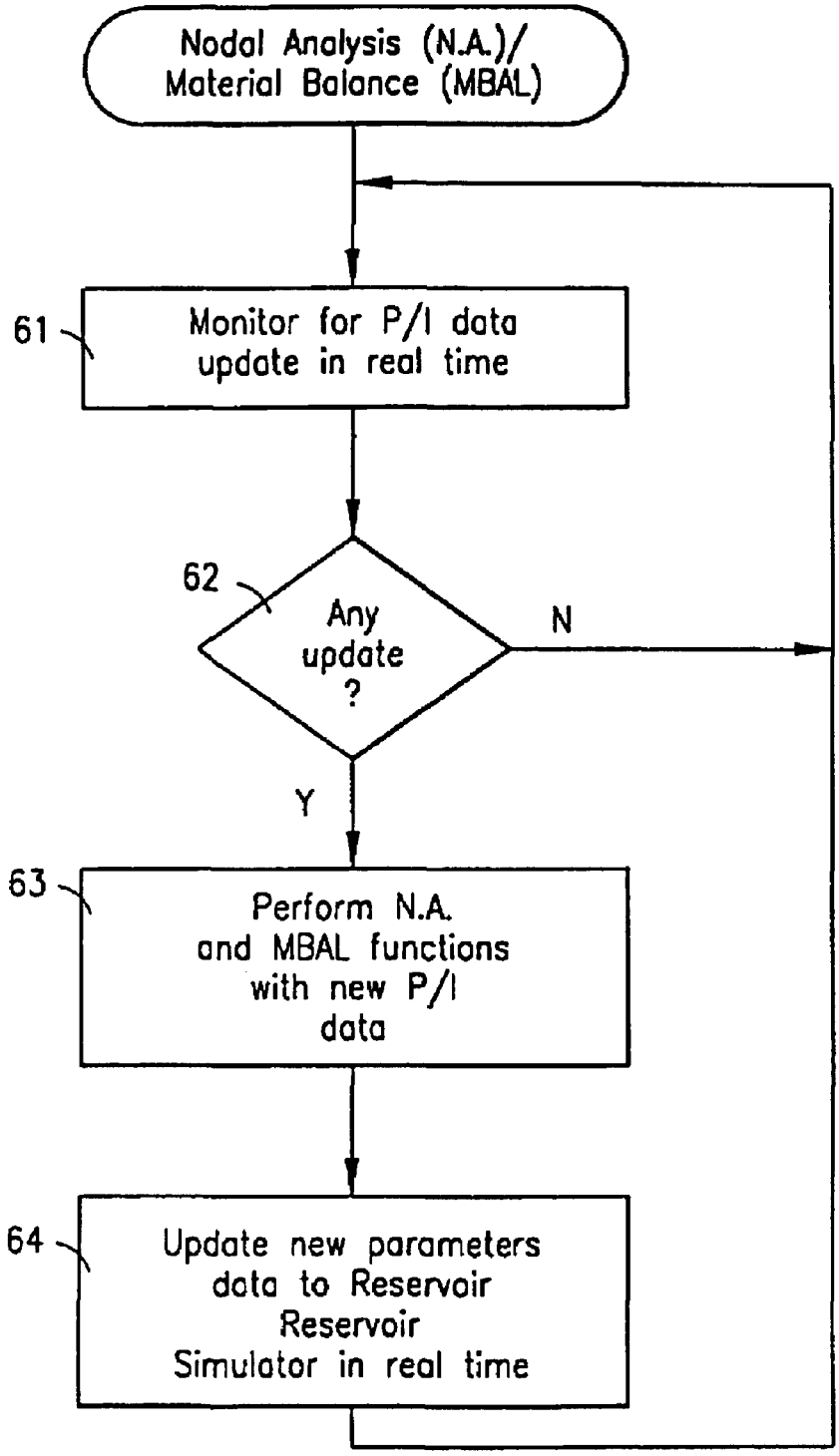
FIG. 6 illustrates exemplary operations which can be performed by the controller of FIG. 4A to implement the nodal analysis function and the material balance function of FIG. 4.

FIG. 6 illustrates exemplary operations which can be performed by the controller 400 of FIG. 4A to implement the Nodal Analysis function 35 and the Material Balance function 34 of FIG. 4. At 61, the controller monitors for real time updates of the P/I data from the data management function 32. If any update is detected at 62, then conventional Nodal Analysis and Material Balance functions are performed at. 63 using the real time updated P/I data. At 64, new parameters produced at 63 are updated in real time to the Reservoir Simulation function 33.

Figure 7:
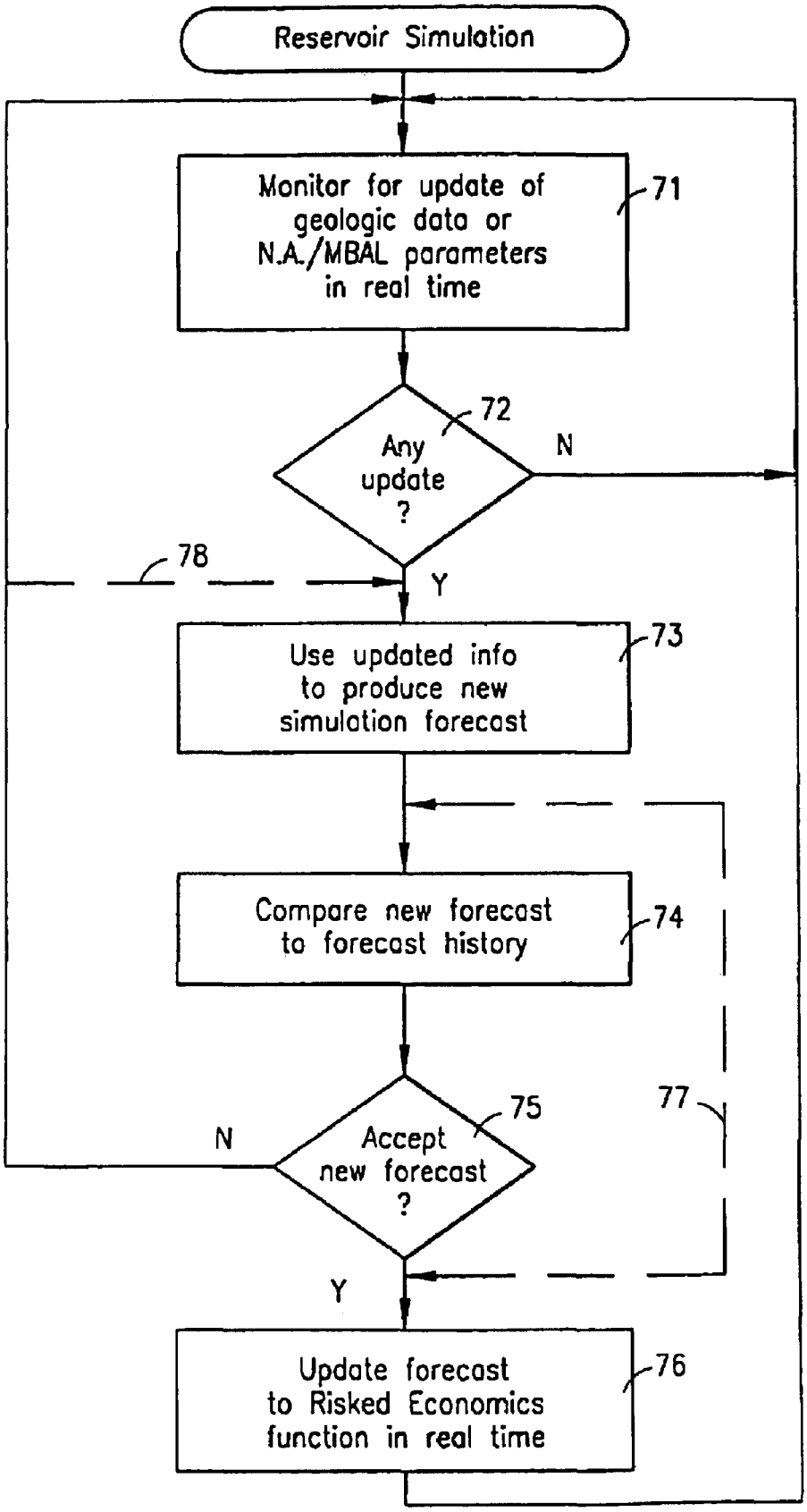
FIG. 7 illustrates exemplary operations which can be performed by the controller of FIG. 4A to implement the reservoir simulation function of FIG. 4.

FIG. 7 illustrates exemplary operations which can be performed by the controller 400 of FIG. 4A to implement the Reservoir Simulation function 33 of FIG. 4. At 71, the controller 400 monitors for a real time update of geologic data from the data management function 32 or for a real time update of parameters output from either the Nodal Analysis function 35 or the Material Balance function 34 in FIG. 4. If any of the aforementioned updates are detected at 72, then the updated information is used in conventional fashion at 73 to produce a new simulation forecast. Thereafter at 74, the new simulation forecast is compared to a forecast history (for example, a plurality of earlier simulation forecasts) and, if the new simulation is acceptable at 75 in view of the forecast history, then at 76 the new forecast is updated in real time to the Risked Economics function 36 of FIG. 4.

Referring to the comparison and decision at 74 and 75, a new forecast could be rejected, for example, if it is considered to be too dissimilar from one or more earlier forecasts in the forecast history. If the new forecast is rejected at 75, then either another forecast is produced using the same updated information (see broken line at 78), or another real time update of the input information is awaited at 71. The broken line at 77 further indicates that the comparison and decision steps at 74 and 75 can be omitted as desired in some embodiments.

Figure 8:
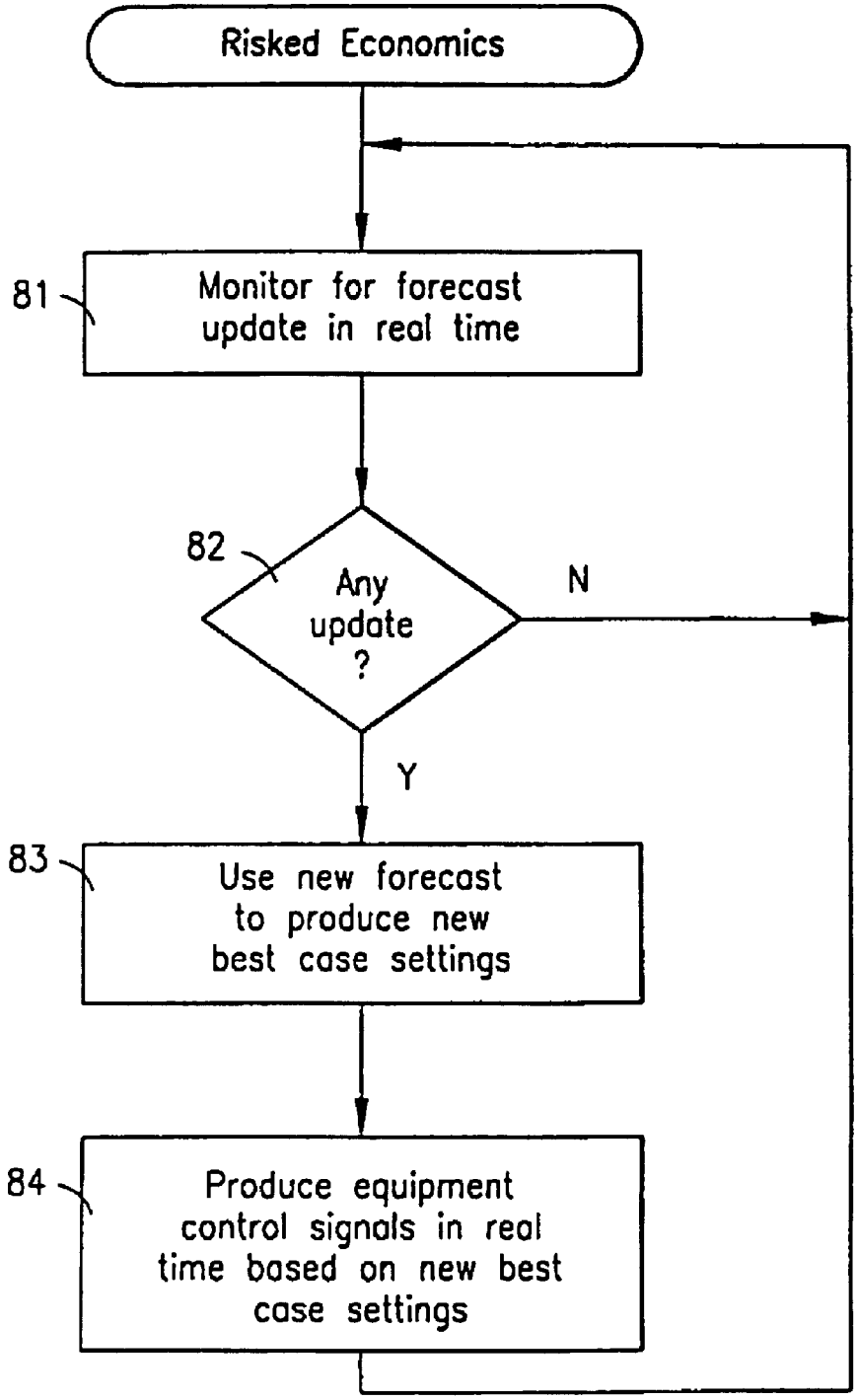
FIG. 8 illustrates exemplary operations which can be performed by the controller of FIG. 4A to implement the risked economics function of FIG. 4.

FIG. 8 illustrates exemplary operations which can be performed by the controller 400 of FIG. 4A to implement the Risked Economics function 36 of FIG. 4. At 81, the controller monitors for a real time update of the simulation forecast from the Reservoir Simulation function 33 of FIG. 4. If any update is detected at 82, then the new forecast is used in conventional fashion to produce new best case settings for the controlled equipment 402. Thereafter at 84, equipment control signals such as illustrated at 50 in FIG. 4 are produced in real rime based on the new best case settings.

The following Table 1 includes a suite of tools (computer programs) that seamlessly interface with each other to generate a field wide production/injection forecast that is used to control production and injection in wells on a real time basis.

TABLE 1

| Flow Chart Number | Input Data | Output Data | Computer Program (Commercial Name or Data Source) | Source of Program (name of company) |
|---|---|---|---|---|
| 1. Downhole Prod. (across reservoir interval) | Pressure, temp, flow rates | Annulus (between tubing and casing) annular and tubing pressure (psi), temp (degrees, Fahrenheit, Centigrade), flow rate) | | |
| 2. Seabed prod. (at subsea tree & subsea manifold) | Pressure, temp, flow rates | Pressure, temperature | | |
| 3. Surface prod. (at separators, compressors, manifolds, other surface equipment) | Pressure, temp, flow rates | Pressure, temperature | | |
| 4. Pressure Transient Analysis | Pressure, temp, flow rates | Reservoir Permeability<br>Reservoir Pressure, Skin, distance to boundaries | Saphir<br>PTA | Kappa Engineering<br>Geographix |
| 5. Logs, Cores, SDL | | Pressure, temperature | | |
| 6. Log processing (interpretation) | | Saturations<br>Porosity<br>Clay Content | Petroworks<br>Prizm<br>DPP | Landmark Graphics<br>Geographix<br>Halliburton |
| 6A. Stratigraphy | | | Stratworks | Landmark Graphics |
| 6B. Mapping | | | Z-Map | Landmark Graphics |
| 7. Seismic Data | | | | |
| 8. Seismic Processing and Interpretation | | Hydrocarbon indicators<br>Stratigraphy<br>Structure | Seisworks<br>Earthcube | Landmark Graphics |
| 9. Geostatistics | | | Sigmaview | Landmark Graphics |
| 10. Geocellular | | | Stratamodel | Landmark Graphics |
| 11. Upscaling | | | Geolink | Landmark |

TABLE 1-continued

| Flow Chart Number | Input Data | Output Data | Computer Program (Commercial Name or Data Source) | Source of Program (name of company) |
|---|---|---|---|---|
| | | | | Graphics Geoquest |
| 12. Data Management, Data Repository | Outputs from other boxes | | Finder Open works Open/Explore TOW/cs DSS32 | Landmark Graphics |
| 13. Reservoir simulation | Field or well production profile with time | | VIP Eclipse | Landmark Graphics Geoquest |
| 14. Material Balance | Fluid Saturations, Pressure reservoir geometry, temp, fluid physical prop., flow rate, reservoir physical properties | Hydrocarbon, in-place reservoir drive mechanism, production profile | MBAL | Petroleum Experts |
| 15. Nodal Analysis, Reservoir and Fluid properties | Wellbore configurations, surface facility configurations | Rate vs. Pressure for various system and constraints | WEM GAP Prosper Openflow | P. E. Mosely & Associates Petroleum Experts Geographix |
| 16. Risked Economics | Product Price Forecast, Revenue Working Interest, Discount Rate, Production Profile, Capital Expense, Operating Expense | Rate of return, net present value, payout, profit vs. investment ratio and desired field wide production rates. | Aries ResEV | Landmark Graphics |
| 17. Control Production | | Geometry | | |

It will be understood by those skilled in the art that the practice of the present invention is not limited to the use of the programs disclosed in Table 1, or any of the aforementioned programs. These programs are merely examples of presently available programs which can be suitably enhanced for real time operations, and used to practice the invention.

It will be understood by those skilled in the art that the method and system of reservoir management may be used to optimize development of a newly discovered reservoir and is not limited to utility with previously developed reservoirs.

A preferred embodiment of the invention has been illustrated in the accompanying Drawings and described in the foregoing Detailed Description, it will be understood that the invention is not limited to the embodiment disclosed, but is capable of numerous modifications without departing from the scope of the invention as claimed.

We claim:

[1. A method comprising:

receiving data indicative of at least one reservoir characteristic;

determining, in relation to the data, a target production/injection in real time; and determining a control device setting in relation to the target production/injection.]

[2. The method of claim 1 further comprising:

allocating the target production/injection between one or more selected reservoir management intervals of the reservoir; and determining the control device setting for a control device associated with at least one of the selected management intervals in relation to the target production/injection.]

[3. The method of claim 2 further comprising:

comparing the target production/injection to an actual production/injection; and determining the control device setting in relation to a difference between the target production/injection and the actual production/injection.]

[4. The method of claim 1 further comprising:

comparing the target production/injection to an actual production/injection; and determining the control device setting in relation to a difference between the target production/injection and the actual production/injection.]

[5. The method of claim 4 wherein determining the control device setting comprises determining the control device setting if a difference between the target production/injection and the actual production/injection is greater than a specified variance.]

[6. The method of claim 1 wherein determining the control device setting comprises determining the control device setting in real time.]

[7. The method of claim 1 wherein determining the target production/injection in real time comprises:

monitoring for changes in the data indicative of at least one reservoir characteristic; and if a change is detected, determining the target production/injection.]

[8. The method of claim 1 wherein receiving data indicative of at least one reservoir characteristic comprises receiving the data in real time.]

[9. The method of claim 1 wherein receiving data indicative of at least one reservoir characteristic comprises receiving data indicative of at least geologic data; and wherein determining the target production/injection in real time comprises determining a reservoir model adjustment using the data indicative of at least geologic data and determining the target production/injection in relation to the reservoir model.]

[10. The method of claim 9 wherein determining the reservoir model adjustment comprises determining the reservoir model adjustment in real time.]

[11. The method of claim 9 further comprising determining the reservoir model adjustment with data indicative of at least one of downhole pressure, flow or temperature.]

[12. The method of claim 9 further comprising selecting at least one well location based on the reservoir model.]

[13. The method of claim 1 wherein determining the target production/injection comprises determining the target production/injection using at least one of nodal analysis, material balance calculations, risked economic analysis, or reservoir simulation.]

[14. The method of claim 1 wherein determining a control device setting comprises determining a setting for at least one of a downhole control device, a surface control device, or a seabed control device.]

[15. The method of claim 1 wherein receiving data indicative of at least one reservoir characteristic comprises receiving data indicative of at least one of pressure, temperature, viscosity, flow rate, compositional profiles, log data, core data, SDL data, or seismic data.]

[16. The method of claim 1 wherein determining a control device setting comprises determining a setting for at least a production control device.]

[17. The method of claim 1 wherein determining, in relation to the data, a target production/injection in real time comprises determining, in relation to the data, the target production/injection continuously.]

[18. The method of claim 1 wherein determining, in relation to the data, a target production/injection in real time comprises determining the target production/injection based at least in part on the data.]

[19. The method of claim 1 further comprising communicating the determined control device setting to a control device.]

[20. The method of claim 19 wherein the control device is remote from the location at which the control device setting is determined.]

[21. The method of claim 19 wherein communicating the determined control device setting to a control device comprises communicating the determined control device setting over a communication network.]

[22. The method of claim 21 wherein the communication network is a telephone network.]

[23. The method of claim 19 wherein communicating the determined control device setting to a control device comprises communicating the control device setting to a person involved in communicating the control device setting to the control device.]

[24. The method of claim 1 wherein determining the control device setting comprises determining an adjustment to the control device.]

[25. An article comprising a machine-readable medium storing instructions operable to cause one or more machines to perform operations comprising:

determining, in real time, a target production/injection in relation to received data indicative of at least one reservoir characteristic; and determining a setting for a control device in relation to the target production/injection.]

[26. The article of claim 25 wherein the instructions are further operable to cause one or more machines to perform operations comprising:

allocating the target production/injection between one or more selected reservoir management intervals;

determining the control device setting for a control device associated with at least one of the selected management intervals in relation to the target/production injection.]

[27. The article of claim 26 wherein the instructions are further operable to cause one or more machines to perform operations comprising:

comparing the target production/injection to an actual production/injection; and determining the control device setting in relation to a difference between the target production/injection and the actual production/injection.]

[28. The article of claim 25 wherein the instructions are further operable to cause one or more machines to perform operations comprising:

comparing the target production/injection to an actual production/injection; and determining the control device setting in relation to a difference between the target production/injection and the actual production/injection.]

[29. The article of claim 28 wherein determining the control device setting comprises determining the control device setting if a difference between the target production/injection and the actual production/injection is greater than a specified variance.]

[30. The article of claim 25 wherein determining the control device setting comprises determining the control device setting in real time.]

[31. The article of claim 25 wherein determining the target production/injection in real time comprises:

monitoring for changes in the data indicative of at least one reservoir characteristic; and if a change is detected, determining the target production/injection.]

[32. The article of claim 25 wherein the received data indicative of at least one reservoir characteristic is received in real time.]

[33. The article of claim 25 wherein the received data indicative of at least one reservoir characteristic comprises data indicative of at least geologic data; and wherein determining, in real time, a target production/injection comprises determining a reservoir model adjustment using the data indicative of at least geologic data and determining the target production/injection in relation to the reservoir model.]

[34. The article of claim 33 wherein determining a reservoir model adjustment comprises determining the reservoir model adjustment in real time.]

[35. The article of claim 33 wherein determining a reservoir model adjustment comprises determining the reservoir model adjustment using further data indicative of at least one of downhole pressure, flow or temperature.]

[36. The article of claim 33 wherein the instructions are further operable to cause one or more machines to perform operations comprising selecting at least one well location based on the reservoir model.]

[37. The article of claim 25 wherein determining a target production/injection comprises determining the target production/injection using at least one of model analysis, material balance calculations, risked economic analysis, or reservoir simulation.]

[38. The article of claim 25 wherein determining a setting for a control device comprises determining a setting for at least one of a downhole control device, a surface control device, or a seabed control device.]

[39. The article of claim 25 wherein the received data indicative of at least one reservoir characteristic comprises data indicative of at least one of pressure, temperature, viscosity, flow rate, compositional profiles, log data, core data, SDL data, or seismic data.]

[40. The article of claim 25 wherein determining a setting for a control device comprises determining a setting for at least a production control device.]

[41. The article of claim 25 wherein determining, in real time, a target production/injection comprises determining a target production/injection continuously.]

[42. The article of claim 25 wherein determining, in real time a target production/injection in relation to received data comprises determining, in real time a target production/injection based at least in part on the received data.]

[43. The article of claim 25 wherein the instructions are further operable to cause one or more machines to perform operations comprising:

communicate the setting for the control device to the control device.]

[44. The article of claim 43 wherein the control device is remote from the location at which the control device setting is determined.]

[45. The article of claim 43 wherein communicating the determined control device setting to a control device comprises communicating the determined control device setting over a communication network.]

[46. The article of claim 45 wherein the communication network is telephone network.]

[47. The article of claim 43 wherein communicating the setting for the control device to the control device comprises communicating the control device setting to a person involved in communicating the control device setting to the control device.]

[48. The article of claim 25 wherein determining a setting for a control device comprises determining an adjustment to the control device.]

[49. A system comprising:

at least one processor; and at least one memory coupled to the processor and storing instructions operable to cause the processor to perform operations comprising:

determining, in real time, a target production/injection in relation to received data indicative of at least one reservoir characteristic; and determining a setting for a control device in relation to the target production/injection.]

[50. The system of claim 49 wherein the instructions are further operable to the processor to perform operations comprising:

allocating the target production/injection between one or more selected reservoir management intervals;

determining the control device setting for a control device associated with at least one of the selected management intervals in relation to the target/production injection.]

[51. The system of claim 50 wherein the instructions are further operable to cause the processor to perform operations comprising:

comparing the target production/injection to an actual production/injection; and determining the control device setting in relation to a difference between the target production/injection and the actual production/injection.]

[52. The system of claim 49 wherein the instructions are further operable to cause the processor to perform operations comprising:

comparing the target production/injection to an actual production/injection; and determining the control device setting in relation to a difference between the target production/injection and the actual production/injection.]

[53. The system of claim 52 wherein determining the control device setting comprises determining the control device setting if a difference between the target production/injection and the actual production/injection is greater than a specified variance.]

[54. The system of claim 49 wherein determining the control device setting comprises determining the control device setting in real time.]

[55. The system of claim 49 wherein determining the target production/injection in real time comprises:

monitoring for changes in the data indicative of at least one reservoir characteristic; and if a change is detected, determining the target production/injection.]

[56. The system of claim 49 wherein the received data indicative of at least one reservoir characteristic is received in real time.]

[57. The system of claim 49 wherein the received data indicative of at least one reservoir characteristic comprises data indicative of at least geologic data; and wherein determining, in real time, a target production/injection comprises determining a reservoir model adjustment using the data indicative of at least geologic data and determining the target production/injection in relation to the reservoir model.]

[58. The system of claim 57 wherein determining a reservoir model adjustment comprises determining the reservoir model adjustment in real time.]

[59. The system of claim 57 wherein determining a reservoir model adjustment comprises determining the reservoir model adjustment using further data indicative of at least one of downhole pressure, flow or temperature.]

[60. The system of claim 57 wherein the instructions are further operable to cause the processor to perform operations comprising selecting at least one well location based on the reservoir model.]

[61. The system of claim 49 wherein determining a target production/injection comprises determining the target production/injection using at least one of nodal analysis, material balance calculations, risked economic analysis, or reservoir simulation.]

[62. The system of claim 49 wherein determining a setting for a control device comprises determining a setting for at least one of a downhole control device, a surface control device, or a seabed control device.]

[63. The system of claim 49 wherein the received data indicative of at least one reservoir characteristic comprises data indicative of at least one of pressure, temperature, viscosity, flow rate, compositional profiles, log data, core data, SDL data, or seismic data.]

[64. The system of claim 49 wherein determining a setting for a control device comprises determining a setting for at least a production control device.]

[65. The system of claim 49 wherein determining, in real time, a target production/injection comprises determining a target production/injection continuously.]

[66. The system of claim 49 wherein determining, in real time a target production/injection in relation to received data comprises determining, in real time a target production/injection based at least in part on the received data.]

[67. The system of claim 49 wherein the instructions are further operable to cause one or more machines to perform operations comprising:

communicate the setting for the control device to a control device.]

[68. The system of claim 67 wherein the control device is remote from the location at which the control device setting is determined.]

[69. The system of claim 67 wherein communicating the determined control device setting to a control device comprises communicating the determined control device setting over a communication network.]

[70. The system of claim 67 wherein the communication network is a telephone network.]

[71. The system of claim 67 wherein communicating the setting for the control device to the control device comprises communicating the control device setting to a person involved in communicating the control device setting to the control device.]

[72. The system of claim 49 wherein determining a setting for a control device comprises determining an adjustment to the control device.]

[73. A method comprising:

monitoring data indicative of at least one reservoir characteristic in real time;

if a variance in the data is detected, updating at least one of a nodal analysis, a material balance analysis, reservoir simulation or risked economics analysis; and determining a control device setting in relation to at least one of the nodal analysis, material balance analysis, reservoir simulation or risked economics analysis.]

[74. The method of claim 73 wherein determining a control device setting comprises:

determining a production/injection forecast; and determining the control device setting in relation to the production/injection forecast.]

[75. The method of claim 73 wherein determining a control device setting comprises determining a control device setting in real time.]

[76. The method of claim 73 wherein determining a control device setting comprises determining a setting for at least one of a downhole control device, a surface control device, or a seabed control device.]

[77. The method of claim 73 wherein determining a control device setting comprises determining a setting for at least a production control device.]

[78. The method of claim 73 wherein the nodal analysis comprises determining rate versus pressure for a system.]

[79. The method of claim 73 wherein material balance analysis comprises determining one or more of a hydrocarbon volume, a reservoir drive mechanism and a production profile.]

[80. The method of claim 73 wherein risked economics analysis comprises determining one or more of rate of economic return, net present value, payout, profit versus investment ratio.]

*81. A method for developing a reservoir, the method comprising:*

*performing at least one of, drilling a well that penetrates the reservoir, completing of the well, or producing from the well while drilling;*

*receiving, in real time, data related to a characteristic of the reservoir from downhole collected during the at least one of drilling a well that penetrates the reservoir, completing of the well, or producing from the well while drilling, wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*

*analyzing the data related to the characteristic of the reservoir;*

*generating a control signal for a controlled equipment based, at least in part, on the analyzing of the data;*

*transmitting the control signal to the controlled equipment; and*

*controlling the controlled equipment for an operation related to the well, using the control signal.*

*82. The method of claim 81, wherein the transmitting the control signal to the controlled equipment is in real time.*

*83. The method of claim 81, wherein controlling the controlled equipment for an operation related to the well comprises controlling the controlled equipment for at least one of a downhole operation or a surface operation.*

*84. The method of claim 81, wherein receiving data related to the characteristic of the reservoir comprises receiving at the surface of the Earth, data related to the characteristic of the reservoir.*

*85. The method of claim 81, wherein transmitting the control signal to the controlled equipment comprises transmitting, in real time, a control signal from a location at the surface of the Earth to the controlled equipment.*

*86. The method of claim 81, wherein generating the control signal for the controlled equipment comprises generating the control signal for a downhole apparatus.*

*87. The method of claim 86, wherein the downhole apparatus comprises a downhole sensor.*

*88. The method of claim 81, wherein generating the control signal for the controlled equipment comprises generating the control signal for a downhole sensor to collect data for pressure.*

*89. The method of claim 81, wherein generating the control signal for the controlled equipment comprises generating the control signal for a downhole sensor to collect data for temperature.*

*90. The method of claim 81, wherein generating the control signal for the controlled equipment comprises generating the control signal for controlling a valve.*

*91. The method of claim 81, wherein generating the control signal for the controlled equipment comprises generating the control signal for at least one of a downhole control device, a surface control device, or a seabed control device.*

*92. The method of claim 81, wherein analyzing the data comprises analyzing the data at a location that is remote to the drilling of the well.*

*93. The method of claim 92, wherein receiving the data related to the characteristic of the reservoir comprises receiving over a communication network, the data related to the characteristic of the reservoir.*

*94. The method of claim 81, wherein transmitting the control signal to the controlled equipment comprises transmitting the control signal to the controlled equipment over a communication network, the data related to the characteristic of the reservoir.*

*95. The method of claim 81, wherein seismics comprises cross-well and acoustic seismometry.*

*96. The method of claim 81, further comprising repeating the operations in real time.*

*97. The method of claim 81, wherein the characteristic comprises at least one of fluid density, a characteristic derived from data from an ultrasonic sensor, a characteristic*

*derived from data from a low energy density sensor, a characteristic derived from data from a venturi flow meter, a characteristic derived from data from a multi-electrode resistivity sensor, well resistivity tomography, resistivity map, fluid pressure gradients, a pressure boundary, fluid velocity, water production, or gas entry.*

*98. The method of claim 81, wherein analyzing the data related to the characteristic of the reservoir comprises at least one of analyzing water content to avoid water conning, analyzing resistivity tomography for monitoring movement of flood fronts across a reservoir, mapping a saturation change across a reservoir, analyzing fluid pressure gradients or contours, analyzing pressure boundaries, analyzing zones that have different reservoir pressures, analyzing water production, or analyzing gas entry.*

*99. A system for developing a reservoir, the system comprising:*

*a downhole sensor to collect data related to a characteristic of the reservoir, in real time wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*

*a processor at the surface of the Earth to process data related to the characteristic of the reservoir from downhole;*

*a data base accessible by the processor to store the characteristic of the reservoir; and*

*a control device that is to receive a control signal from the processor to control an operation related to the reservoir, while drilling a well that penetrates the reservoir.*

*100. The system of claim 99, wherein the processor to control an operation related to the reservoir comprises the processor to control at least one of a downhole operation or a surface operation.*

*101. The system of claim 99, wherein the control device is to control the downhole operation during recovery of hydrocarbons from the reservoir while drilling a well for developing the reservoir.*

*102. The system of claim 99, wherein the downhole sensor comprises a downhole sensor to collect seismic data.*

*103. The system of claim 99, wherein the downhole sensor comprises a downhole sensor to collect data for temperature.*

*104. The system of claim 99, wherein the downhole sensor comprises a downhole sensor to collect data for pressure.*

*105. The system of claim 99, wherein the control device is for at least one of a downhole control device, a surface control device, or a seabed control device.*

*106. The system of claim 99, wherein the control device is remote from the location of the processor.*

*107. The system of claim 106, wherein the control device is to receive the control signal over a communication network.*

*108. The system of claim 107, wherein the communication network is a telephone network.*

*109. The system of claim 99, wherein seismics comprises cross-well and acoustic seismometry.*

*110. The system of claim 99, wherein the characteristic comprises at least one of fluid density, a characteristic derived from data from an ultrasonic sensor, a characteristic derived from data from a low energy density sensor, a characteristic derived from data from a venturi flow meter, a characteristic derived from data from a multi-electrode resistivity sensor, well resistivity tomography, resistivity map, fluid pressure gradients, a pressure boundary, fluid velocity, water production, or gas entry.*

*111. The system of claim 99, wherein the processor is to perform at least one of the following operations: analyze water content to avoid water conning, analyze resistivity tomography for monitoring movement of flood fronts across a reservoir, map a saturation change across a reservoir, analyze fluid pressure gradients or contours, analyze pressure boundaries, analyze zones that have different reservoir pressures, analyze water production, or analyze gas entry.*

*112. An article comprising a machine-readable medium storing instructions operable to cause one or more machines to perform operations comprising:*

*receiving, in real time at the surface of the Earth, data related to a characteristic of a reservoir, wherein the characteristic comprises at least one of temperature, annulus pressure, formation pressure, fluid flow rate, fluid flow type, formation resistivity, permeability, seismics, cross-well acoustic seismometry. porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*

*analyzing the data related to the characteristic of the reservoir;*

*generating a control signal for a control device for an operation relating to the reservoir based, at least in part, on the analyzing of the data; and*

*transmitting the control signal to the control device for controlling the control device while drilling of a well for developing the reservoir.*

*113. The article of claim 112, wherein generating a control signal for a control device for an operation related to the reservoir comprises generating a control signal for a control device to control at least one of a downhole operation, or a surface operation.*

*114. The article of claim 112, wherein the transmitting the control signal to the control device comprises transmitting the control signal to the control device in real time.*

*115. The article of claim 112, wherein controlling the control device for the downhole operation occurs, at least in part, during recovery of hydrocarbons from the reservoir while drilling a well for developing the reservoir.*

*116. The article of claim 112, wherein generating the control signal for the control device comprises generating the control signal for a downhole sensor.*

*117. The article of claim 112, wherein generating the control signal for the control device comprises generating the control signal for a downhole sensor to collect data for pressure.*

*118. The article of claim 112, wherein generating the control signal for the control device comprises generating the control signal for a downhole sensor to collect data for temperature.*

*119. The article of claim 112, wherein generating the control signal for the control device comprises generating the control signal for a valve.*

*120. The article of claim 112, wherein generating the control signal for the control device comprises generating the control signal for at least one of a downhole control device, a surface control device, or a seabed control device.*

*121. The article of claim 112, wherein seismics comprises cross-well and acoustic seismometry.*

*122. The article of claim 112, further comprising repeating the operations in real time.*

*123. The article of claim 112, wherein the characteristic comprises at least one of fluid density, a characteristic derived from data from an ultrasonic sensor, a characteristic derived from data from a low energy density sensor, a characteristic derived from data from a venturi flow meter, a characteristic derived from data from a multi-electrode resistivity sensor, well resistivity tomography, resistivity map, fluid pressure gradients, a pressure boundary, fluid velocity, water production, or gas entry.*

*124. The article of claim 112, wherein analyzing the data related to the characteristic of the reservoir comprises at least one of analyzing water content to avoid water conning, analyzing resistivity tomography for monitoring movement of flood fronts across a reservoir, mapping a saturation change across a reservoir, analyzing fluid pressure gradients or contours, analyzing pressure boundaries, analyzing zones that have different reservoir pressures, analyzing water production, or analyzing gas entry.*

*125. A method for developing a reservoir, the method comprising:*

*performing the following operations, at least in part, at a location remote from a site of a well being drilled that penetrates the reservoir, from a site of a well being completed, or from a site of a well that is producing from the reservoir while drilling:*

*receiving data in real time, said data related to a characteristic of the reservoir, wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*

*analyzing, with a computer, the data related to the characteristic of the reservoir.*

*126. The method of claim 125, further including the operation:*

*generating, based at least in part on the analyzing of the data, a control signal for a controlled equipment used for drilling the well, completing the well, or producing from the well while drilling.*

*127. The method of claim 125, wherein the characteristic comprises at least one of fluid density, a characteristic derived from data from an ultrasonic sensor, a characteristic derived from data from a low energy density sensor, a characteristic derived from data from a venturi flow meter, a characteristic derived from data from a multi-electrode resistivity sensor, well resistivity tomography, resistivity map, fluid pressure gradients, a pressure boundary, fluid velocity, water production, or gas entry.*

*128. The method of claim 126, wherein analyzing the data related to the characteristic of the reservoir comprises at least one of analyzing water content to avoid water conning, analyzing resistivity tomography for monitoring movement of flood fronts across a reservoir, mapping a saturation change across a reservoir, analyzing fluid pressure gradients or contours, analyzing pressure boundaries, analyzing zones that have different reservoir pressures, analyzing water production, or analyzing gas entry.*

*129. A method for developing a reservoir, the method comprising:*

*performing at least one of, drilling a well that penetrates the reservoir, completing of the well, or producing from the well while drilling;*

*receiving, in real time, data related to a characteristic of drilling the well, completing the well or producing from the well while drilling, wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*

*analyzing the data related to the characteristic;*

*generating a control signal for a flow control device based, at least in part, on the analyzing of the data;*

*transmitting the control signal to the flow control device; and*

*controlling the flow control device for an operation related to the well, using the control signal.*

*130. The method of claim 129, wherein the transmitting the control signal to the controlled equipment is in real time.*

*131. The method of claim 129, wherein generating the control signal for the flow control device comprises generating the control signal for controlling a valve.*

*132. The method of claim 129, wherein analyzing the data comprises analyzing the data at a location that is remote to the drilling of the well.*

*133. The method of claim 129, further comprising repeating the operations in real time.*

*134. The method of claim 126 further including the operation:*

*transmitting the control signal to the controlled equipment.*

*135. The method of claim 134, wherein the analyzing, generating and transmitting operations are in real time.*

* * * * *

UNITED STATES PATENT AND TRADEMARK OFFICE

CERTIFICATE OF CORRECTION

PATENT NO. : RE42,245 E
APPLICATION NO. : 12/436632
DATED : March 22, 2011
INVENTOR(S) : Jacob Thomas It is certified that error appears in the above-identified patent and that said Letters Patent is hereby corrected as shown below:

Col. 22, claim 112, delete "*112. An article comprising a machine-readable medium storing instructions operable to cause one or more machines to perform operations comprising: receiving, in real time at the surface of the Earth, data related to a characteristic of a reservoir, wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics;*
*analyzing the data related to the characteristic of the reservoir;*
*generating a control signal for a control device for an operation relating to the reservoir based, at least in part, on the analyzing of the data; and*
*transmitting the control signal to the control device for controlling the control device while drilling of a well for developing the reservoir.*"

and insert --*112. An article comprising a non-transitory machine-readable medium storing instructions operable to cause one or more machines to perform operations comprising: receiving, in real time at the surface of the Earth, data related to a characteristic of a reservoir, wherein the characteristic comprises at least one of temperature, annulus pressure, formation pressure, fluid flow rate, fluid flow type, formation resistivity, permeability, seismics, cross-well acoustic seismometry, porosity, perforation depth, Surface Data Logging (SDL) data, well log data, core data, water saturation data, oil saturation data, clay content data, pressure transient data, skin data, estimated reservoir boundary, hydraulic pressure, hydraulic power, or fluid characteristics; analyzing the data related to the characteristic of the reservoir; generating a control signal for a control device for an operation relating to the reservoir based, at least in part, on the analyzing of the data; and transmitting the control signal to the control device for controlling the control device while drilling of a well for developing the reservoir.* --, therefor.

Signed and Sealed this
Third Day of May, 2011

David J. Kappos

David J. Kappos
*Director of the United States Patent and Trademark Office*